United States Patent [19]

Raymond

[11] 4,247,941
[45] Jan. 27, 1981

[54] SIMULATOR FOR BIT AND BYTE SYNCHRONIZED DATA NETWORK

[75] Inventor: James C. Raymond, Framingham, Mass.

[73] Assignee: Honeywell Information Systems Inc., Waltham, Mass.

[21] Appl. No.: 53,109

[22] Filed: Jun. 28, 1979

[51] Int. Cl.³ .............................................. G06F 11/30
[52] U.S. Cl. ................................... 371/15; 324/73 R; 364/200; 371/27
[58] Field of Search .................... 371/15, 22, 23, 25, 371/27; 364/200; 324/73 R

[56] References Cited

U.S. PATENT DOCUMENTS

| 3,562,710 | 2/1971 | Halleck | 371/27 X |
| 3,599,161 | 8/1971 | Stoughton et al. | 364/200 |
| 3,825,901 | 7/1974 | Golnek, Sr. et al. | 364/200 |
| 4,048,481 | 9/1977 | Bailey, Jr. et al. | 364/200 X |

*Primary Examiner*—Jerry Smith
*Attorney, Agent, or Firm*—Gerald E. Lester; Nicholas Prasinos; Ronald T. Reiling

[57] ABSTRACT

A data communication simulator system wherein the basic operational conditions of a bit and byte synchronized data network may be simulated by generation of a bit timing signal, a byte timing signal, data signals, and control and status indication signals. Manual as well as automatic testing modes are provided, the manual mode including a signal stepping control arranged to enable either full or half cycle operation.

2 Claims, 46 Drawing Figures

Fig.3a
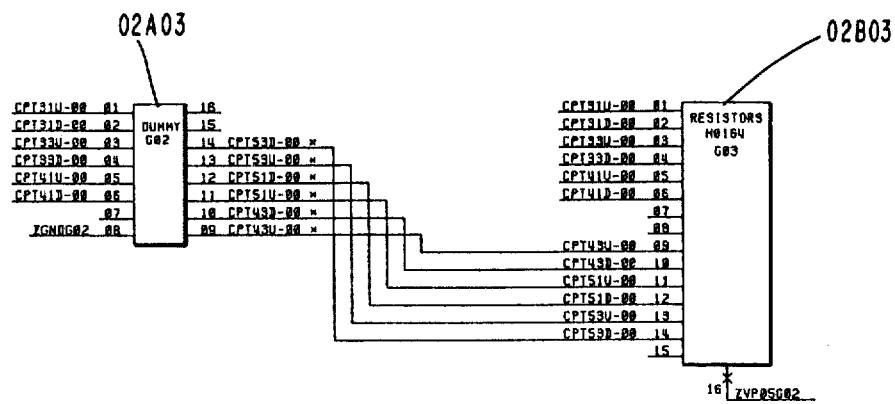
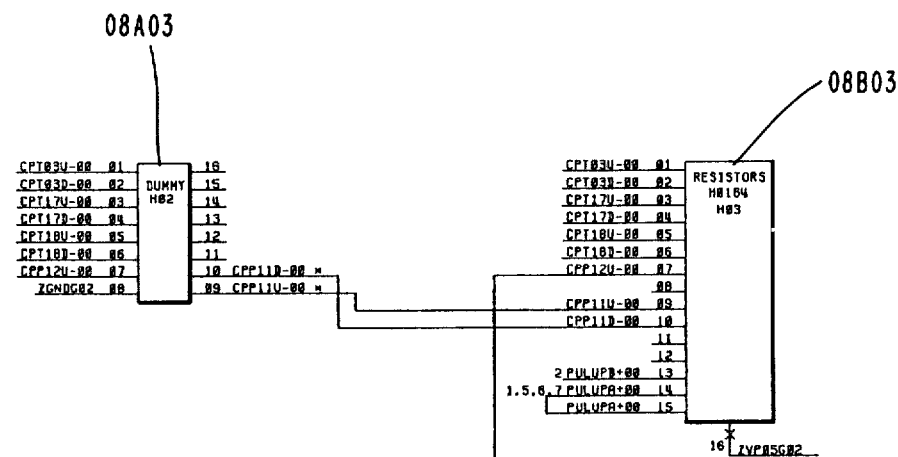
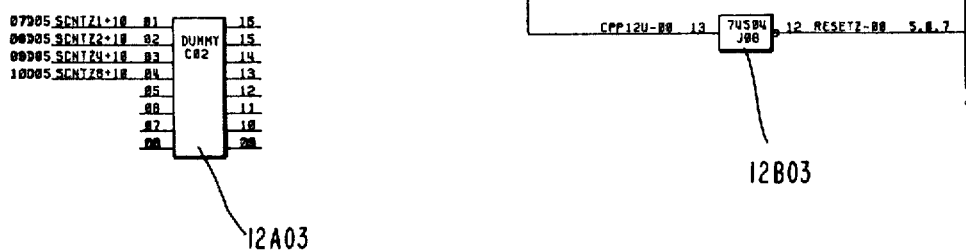

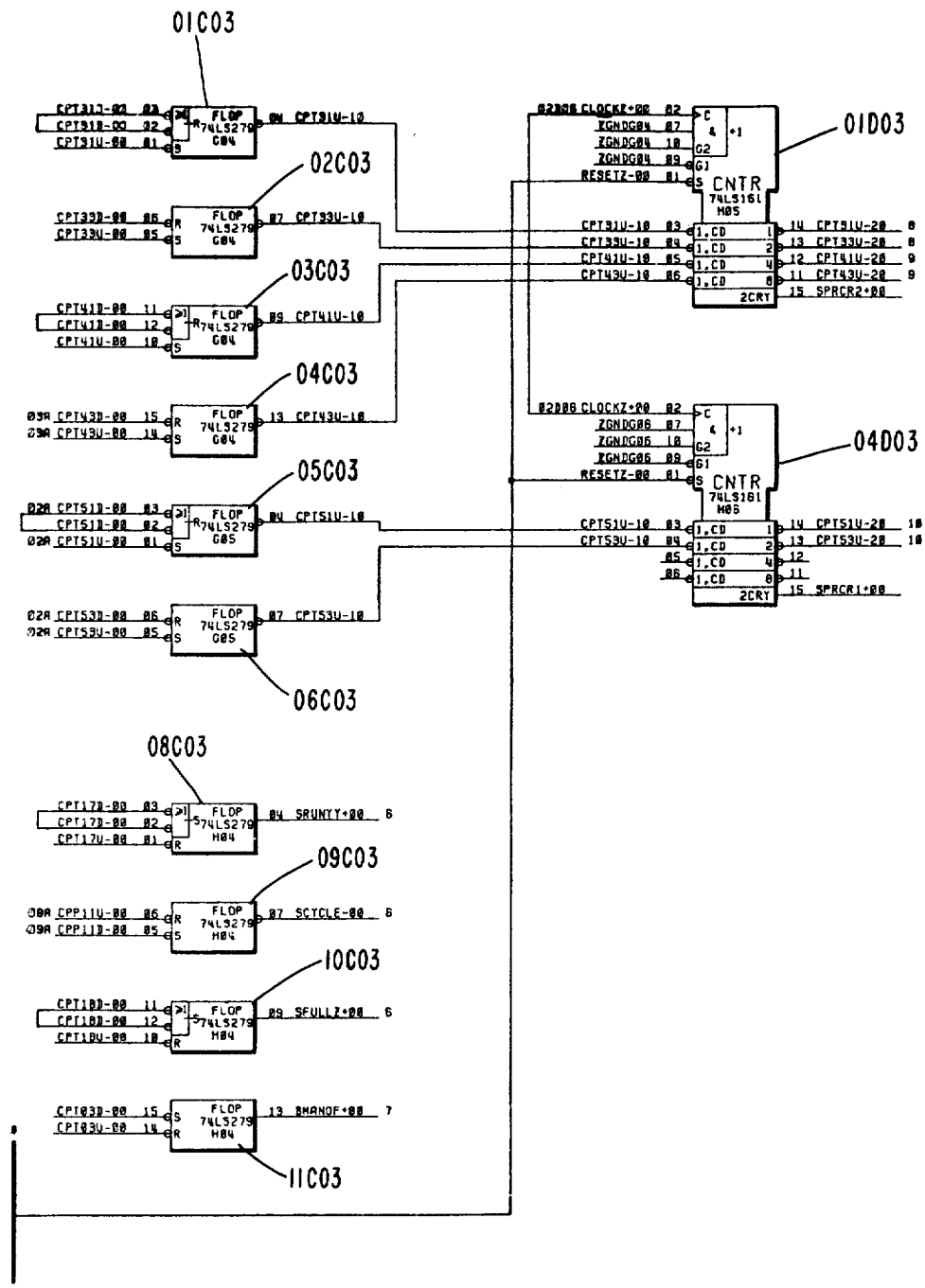

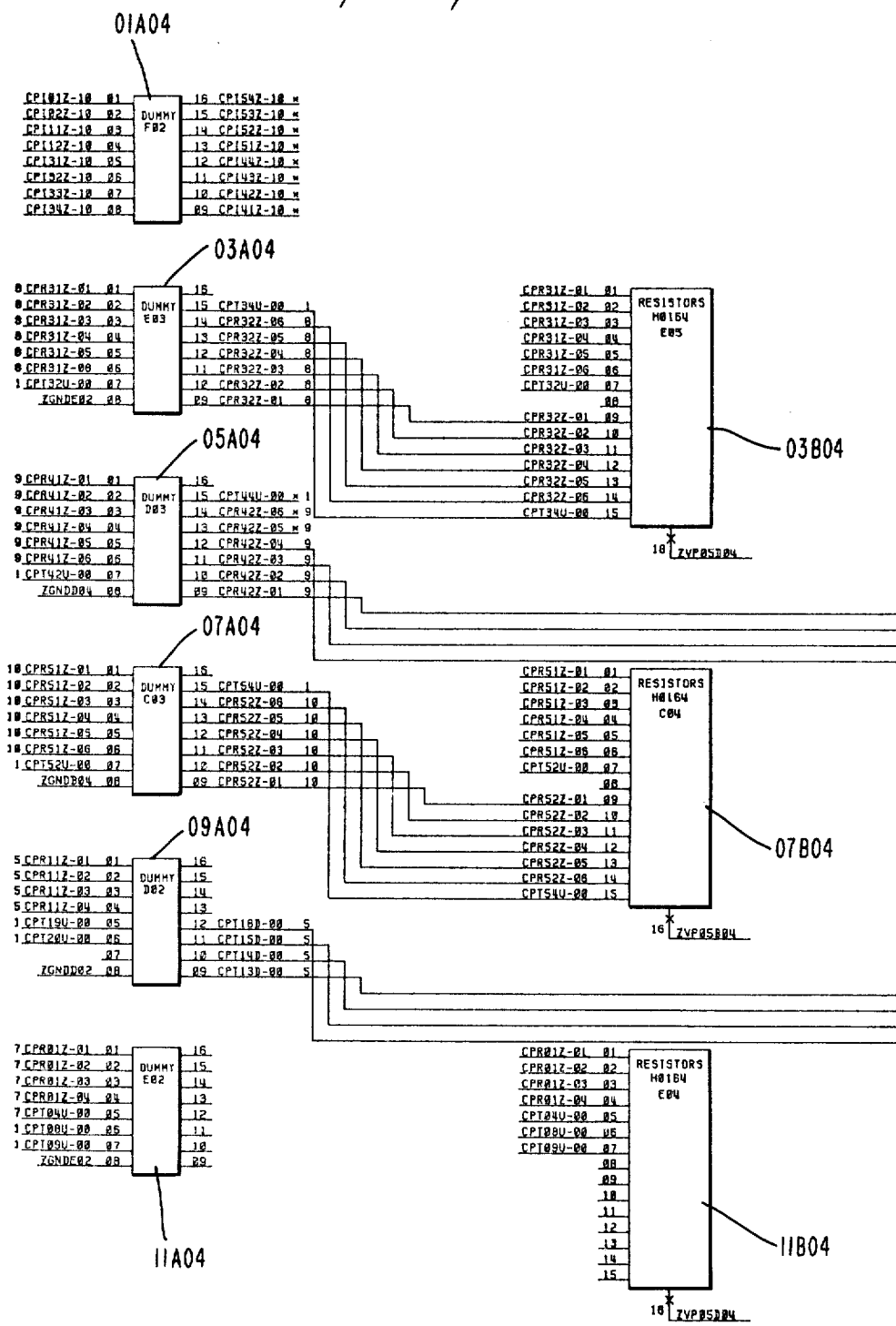

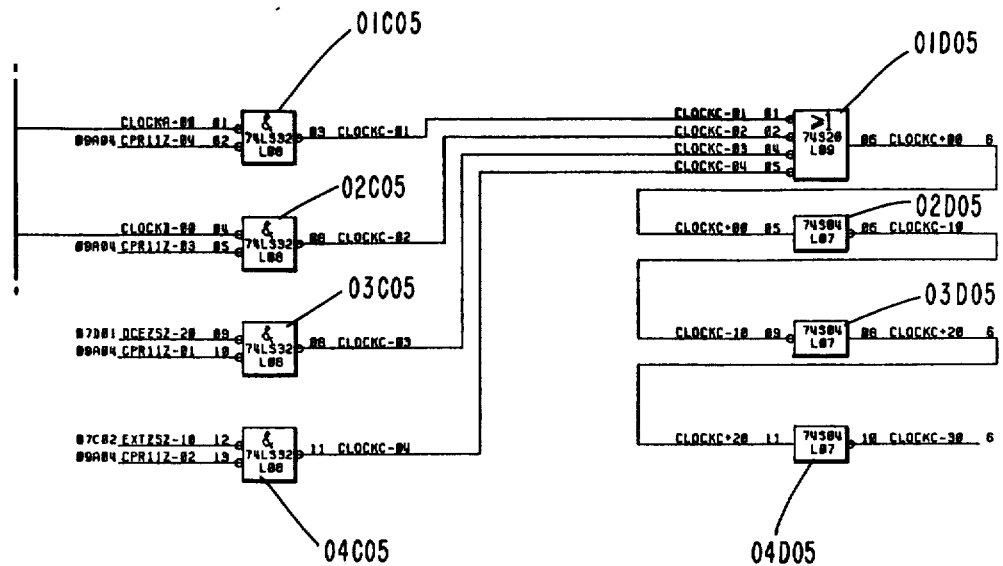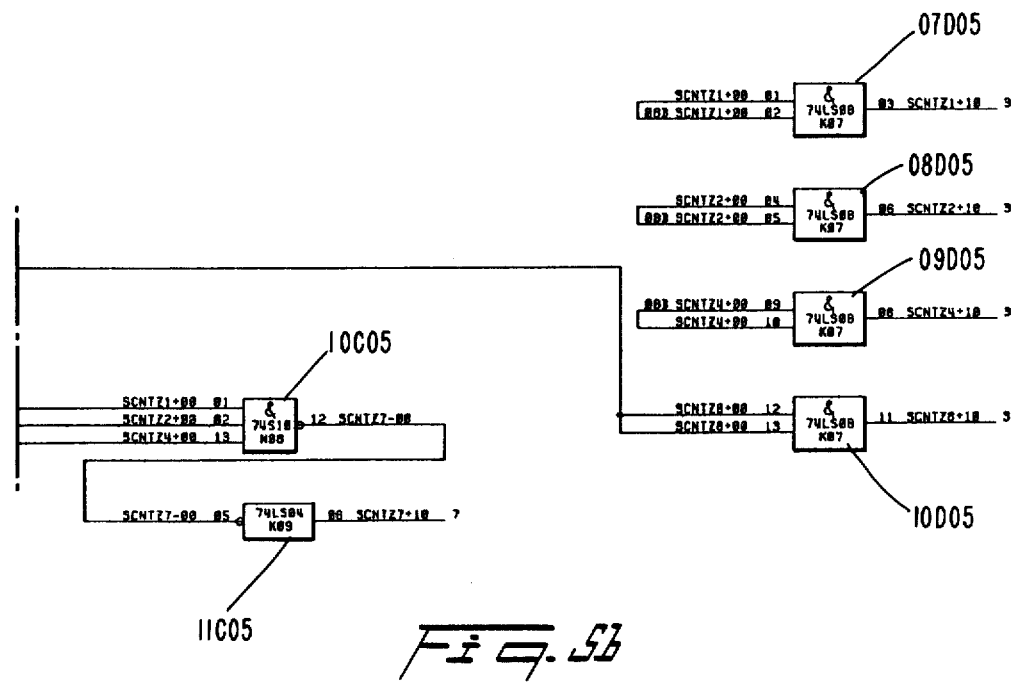
Fig. 5b

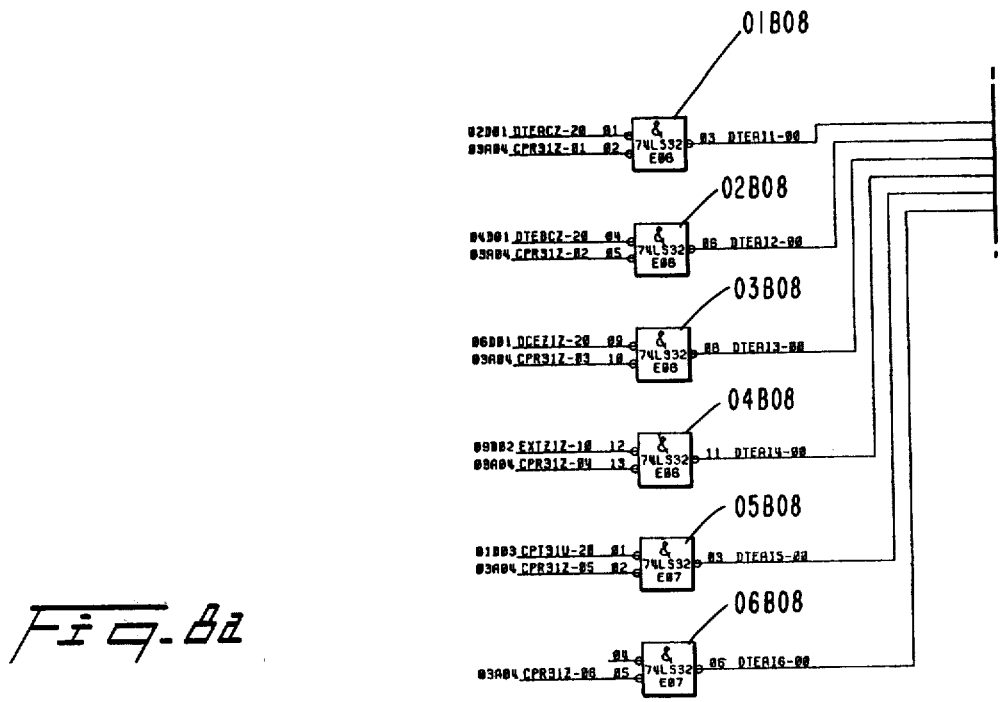
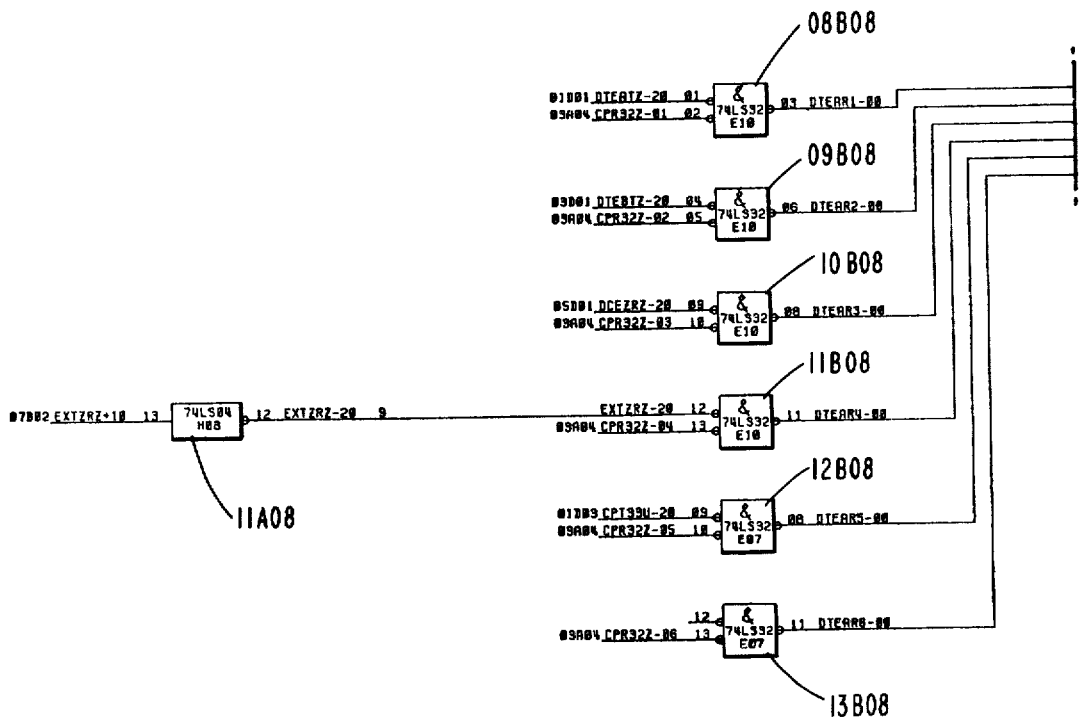
Fig. 8d

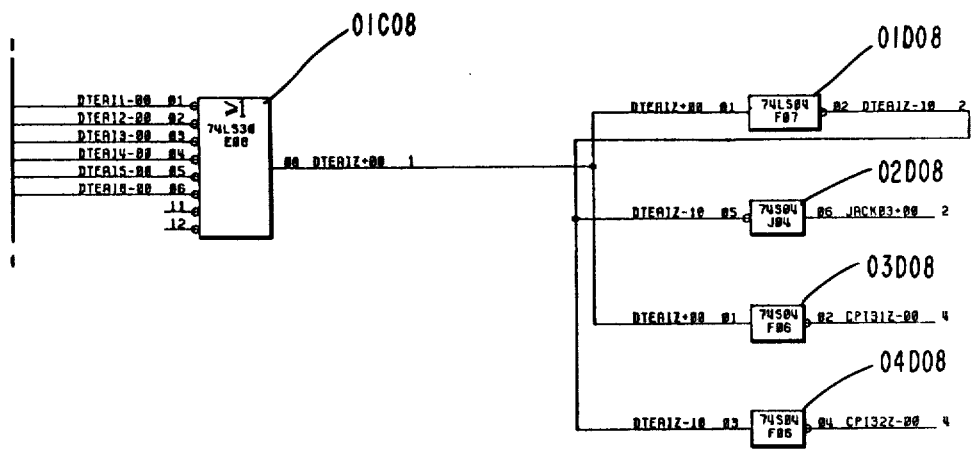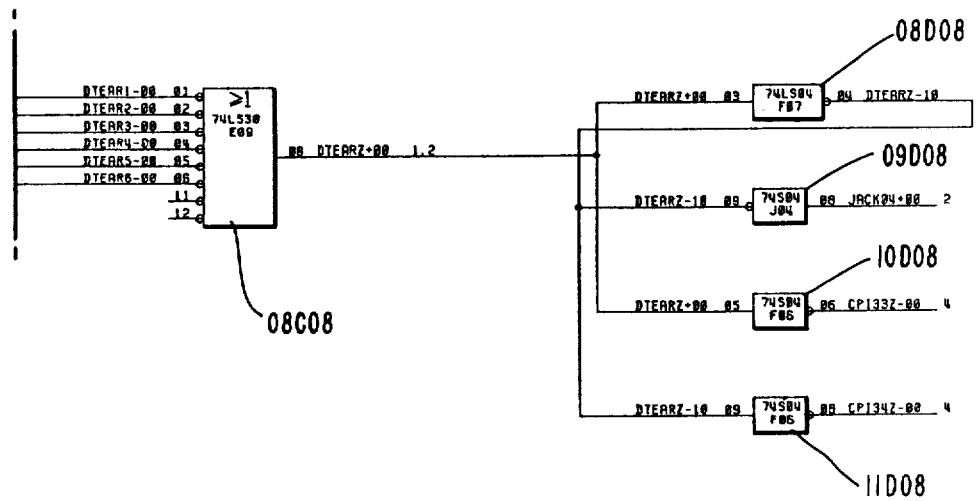
Fig. 66

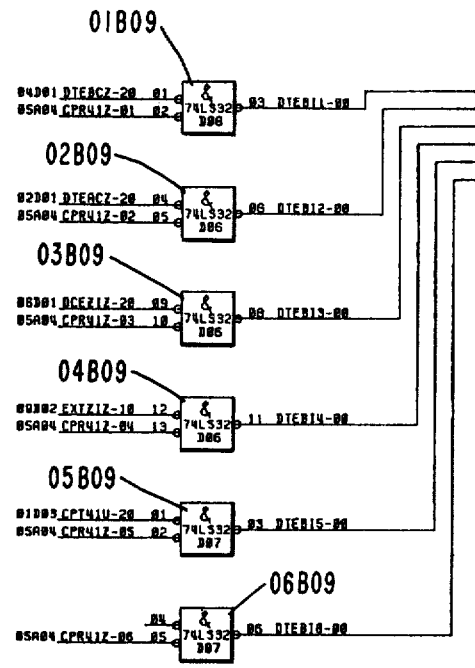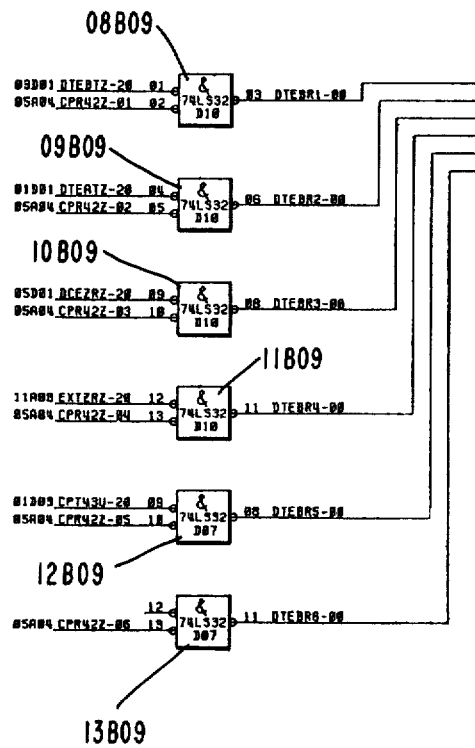
Fig. 9a

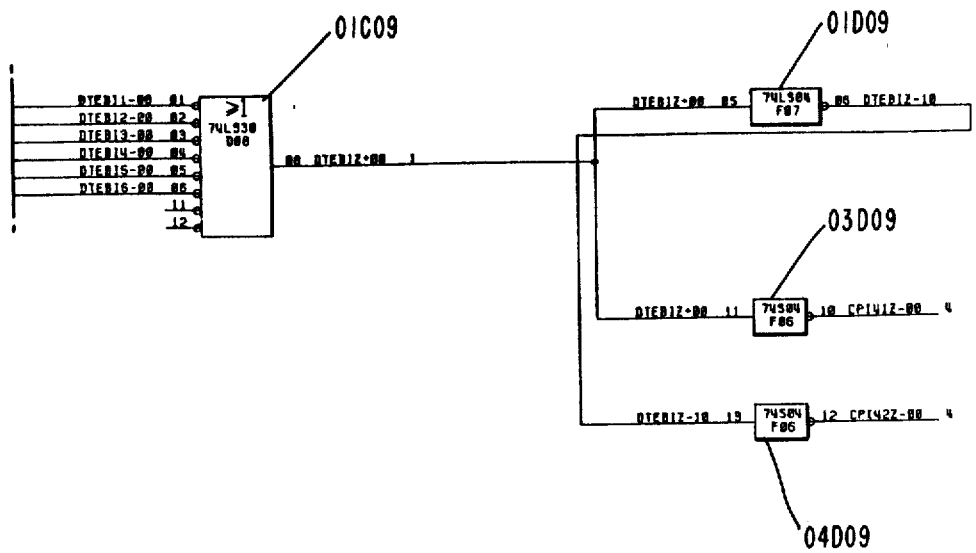
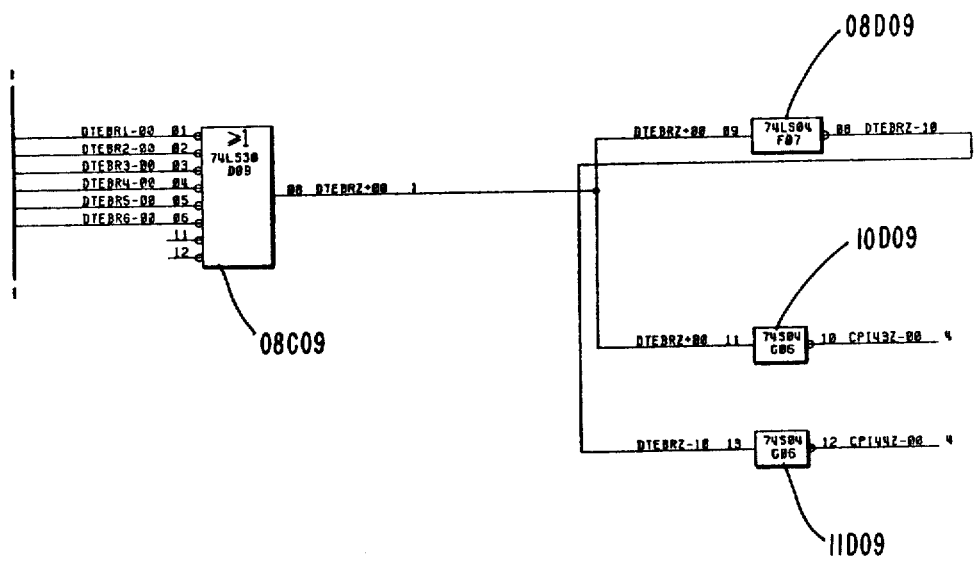
Fig. 9b

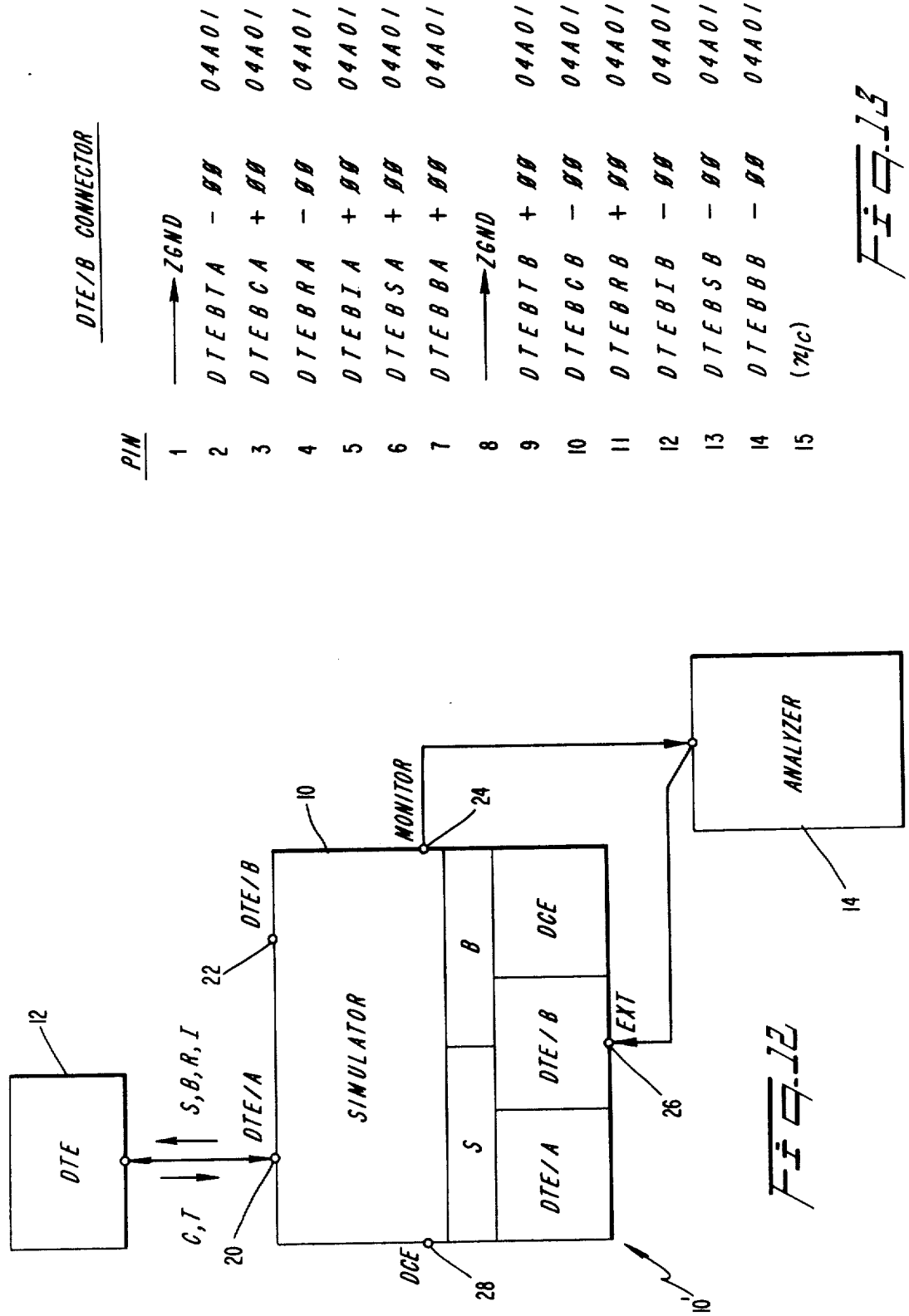

| PIN | DTE/A CONNECTOR | | |
|---|---|---|---|
| 1 | → Z GND. | | |
| 2 | DTEATA | − ØØ | ØIAØI |
| 3 | DTEACA | + ØØ | ØIAØI |
| 4 | DTEARA | − ØØ | ØIAØI |
| 5 | DTEAIA | + ØØ | ØIAØI |
| 6 | DTEASA | + ØØ | ØIAØI |
| 7 | DTEABA | + ØØ | ØIAØI |
| 8 | → Z GND. | | |
| 9 | DTEATB | + ØØ | ØIAØI |
| 10 | DTEACB | − ØØ | ØIAØI |
| 11 | DTEARB | + ØØ | ØIAØI |
| 12 | DTEAIB | − ØØ | ØIAØI |
| 13 | DTEASB | − ØØ | ØIAØI |
| 14 | DTEABB | − ØØ | ØIAØI |
| 15 | (N/C) | | |

Fig. 14

| PIN | DCE CONNECTOR | | |
|---|---|---|---|
| 1 | → Z GND. | | |
| 2 | DCEZTA | − ØØ | ØTAØI |
| 3 | DCEZCA | + ØØ | ØTAØI |
| 4 | DCEZRA | − ØØ | ØTAØI |
| 5 | DCEZIA | + ØØ | ØTAØI |
| 6 | DCEZSA | + ØØ | ØTAØI |
| 7 | DCEZBA | + ØØ | ØTAØI |
| 8 | → Z GND. | | |
| 9 | DCEZTB | + ØØ | ØTAØI |
| 10 | DCEZCB | − ØØ | ØTAØI |
| 11 | DCEZRB | + ØØ | ØTAØI |
| 12 | DCEZIB | − ØØ | ØTAØI |
| 13 | DCEZSB | − ØØ | ØTAØI |
| 14 | DCEZBB | − ØØ | ØTAØI |
| 15 | (N/C) | | |

MONITOR CONNECTOR

| PIN | | | | |
|---|---|---|---|---|
| 1 | CHASSIS GROUND | | | |
| 2 | MONZTD | – ØØ (T) | 01A02 |
| 3 | MONZRD | – ØØ (R) | 01A02 |
| 4 | MONZRS | + ØØ (C) | 01A02 |
| 5 | MONZCS | + ØØ (B) | 01A02 |
| 6 | | | | |
| 7 | SIGNAL GROUND (TWISTED PAIR RETURN) | | | |
| 8 | MONZCD | + ØØ (I) | 01A02 |
| 15 | MONZTC | + ØØ (S) | 01A02 |
| 17 | MONZRC | + ØØ (S) | 01A02 |
| 23 | MONZOC | + ØØ | 01A02 |
| 25 | MONZOF | – ØØ | 01A02 |
| 9, 1Ø, 11, 12, 13, 14, 16, 18, 19, 2Ø, 21, 22, 24 | NOT USED | | | |

Fig. 17

EXTERNAL CONNECTOR

| PIN | | | |
|---|---|---|---|
| 1 | CHASSIS GROUND | | |
| 2 | EXTZZIZ | – ØØ | 06A02 |
| 3 | EXTZRZ | – ØØ | 06A02 |
| 4 | EXTZCZ | + ØØ | 06A02 |
| 5 | | | |
| 6 | | | |
| 7 | SIGNAL GROUND (TWISTED PAIR RETURN) | | |
| 8 | EXTZIZ | + ØØ | 06A02 |
| 9 | | | |
| 10 | | | |
| 11 | | | |
| 12 | | | |
| 13 | | | |
| 14 | | | |
| 15 | EXTZSZ | + ØØ | 06A02 |
| 16 | | | |
| 17 | EXTZRZ | + ØØ | 06A02 |
| 18 | | | |
| 19 | | | |
| 20 → 25 | NOT USED | | |

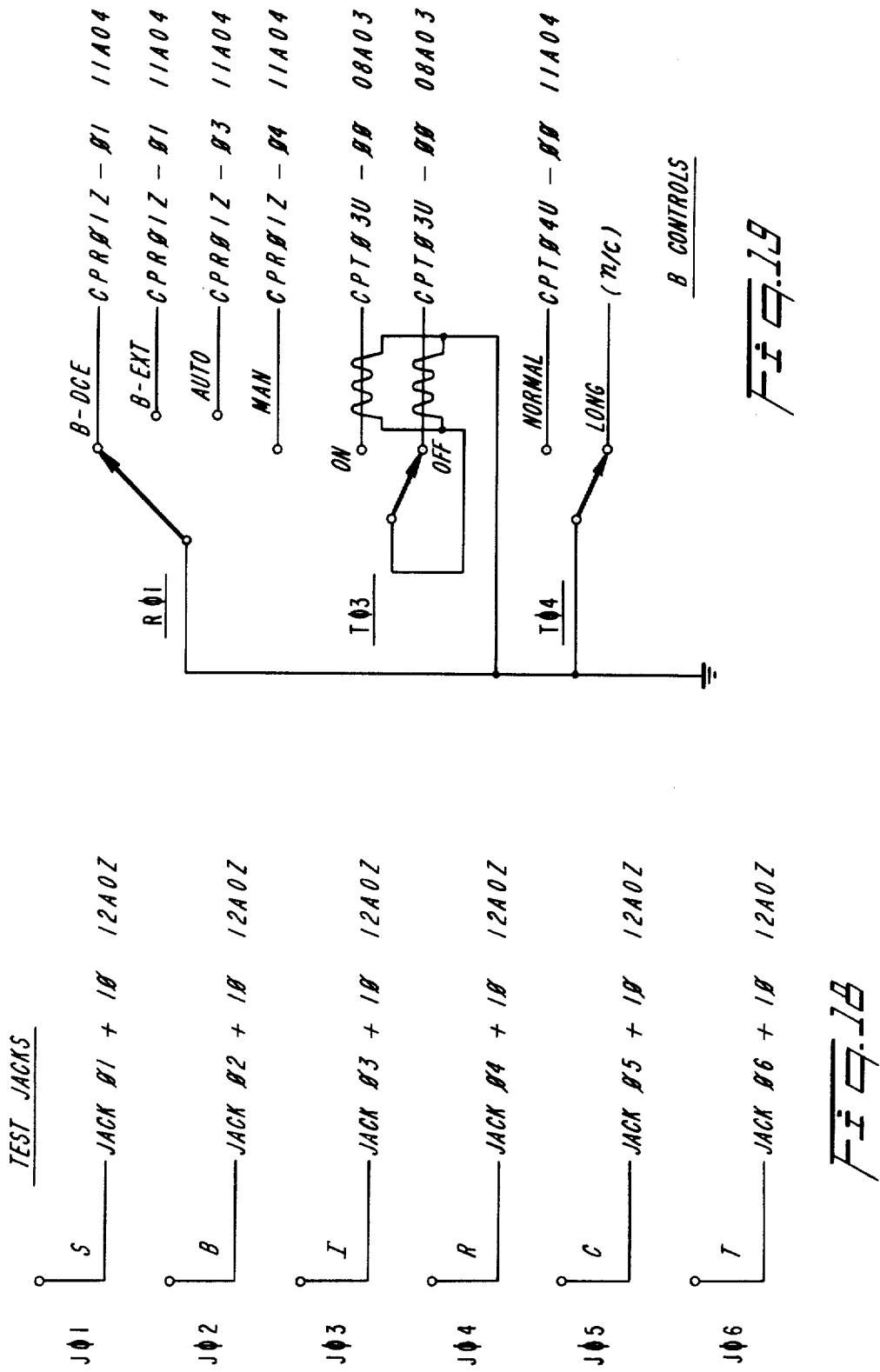

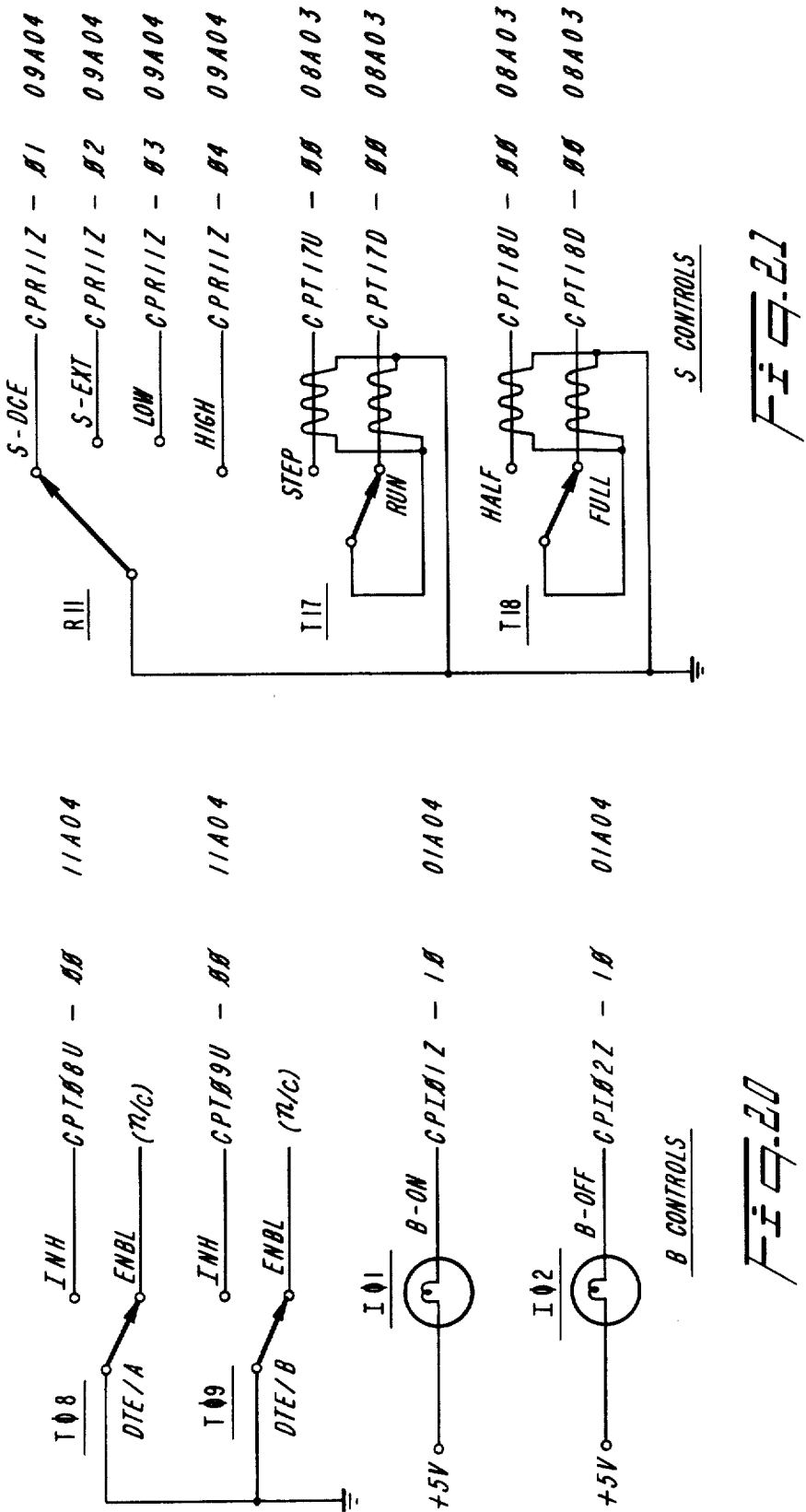

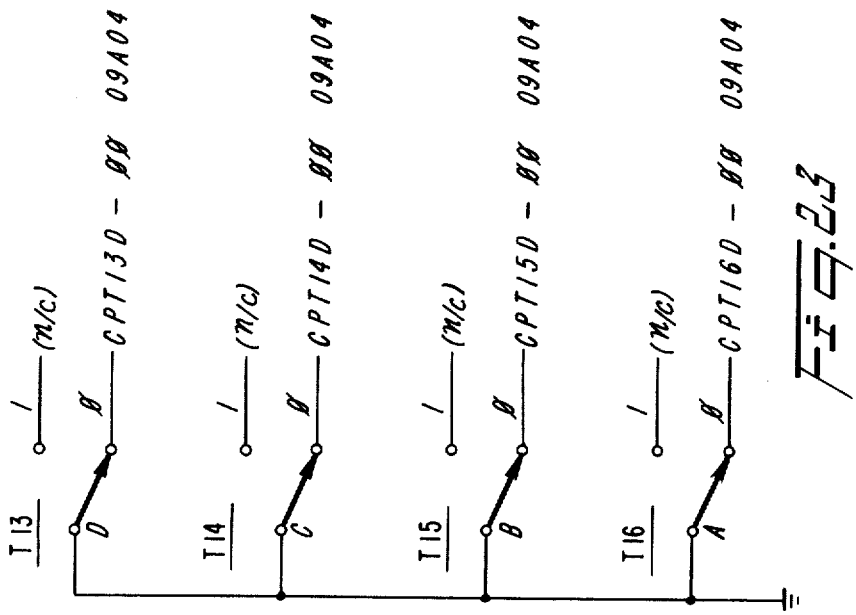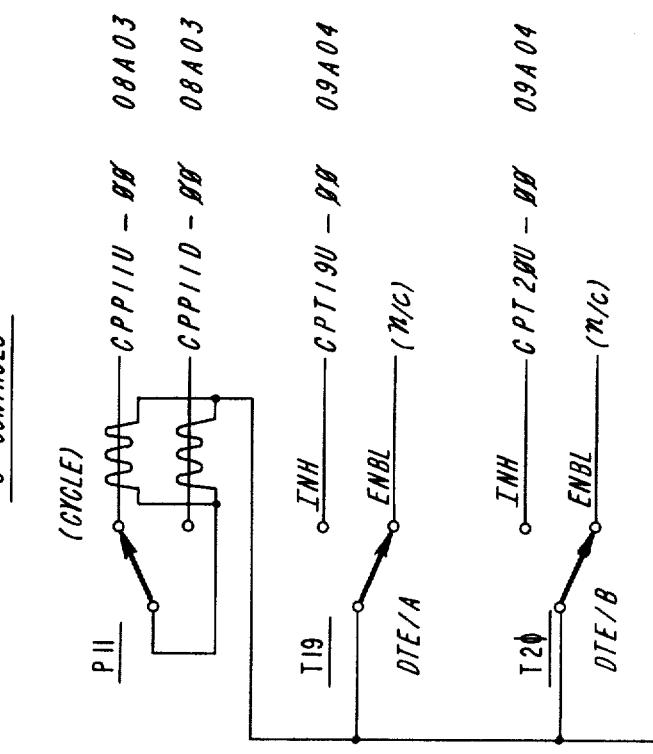

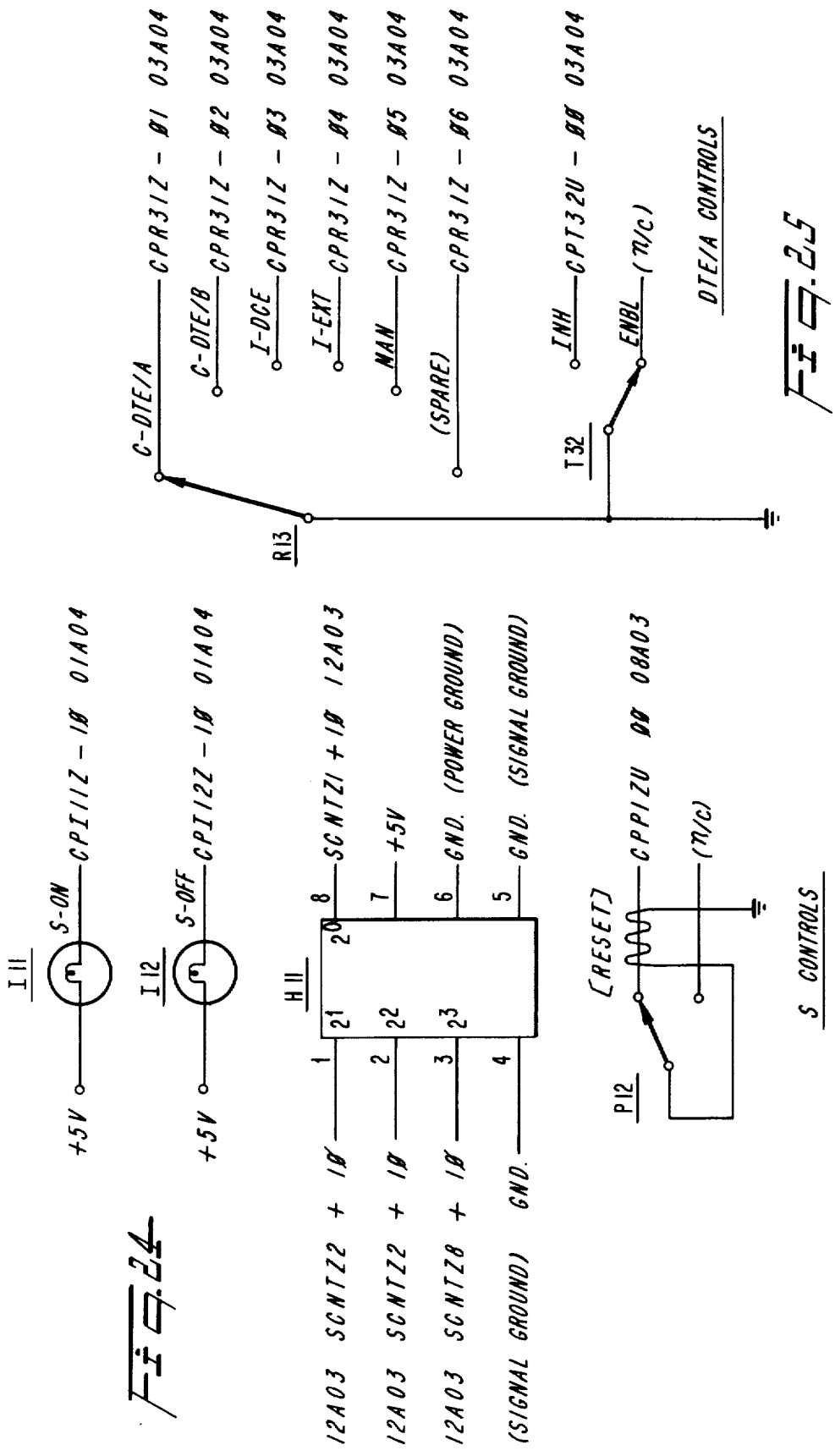

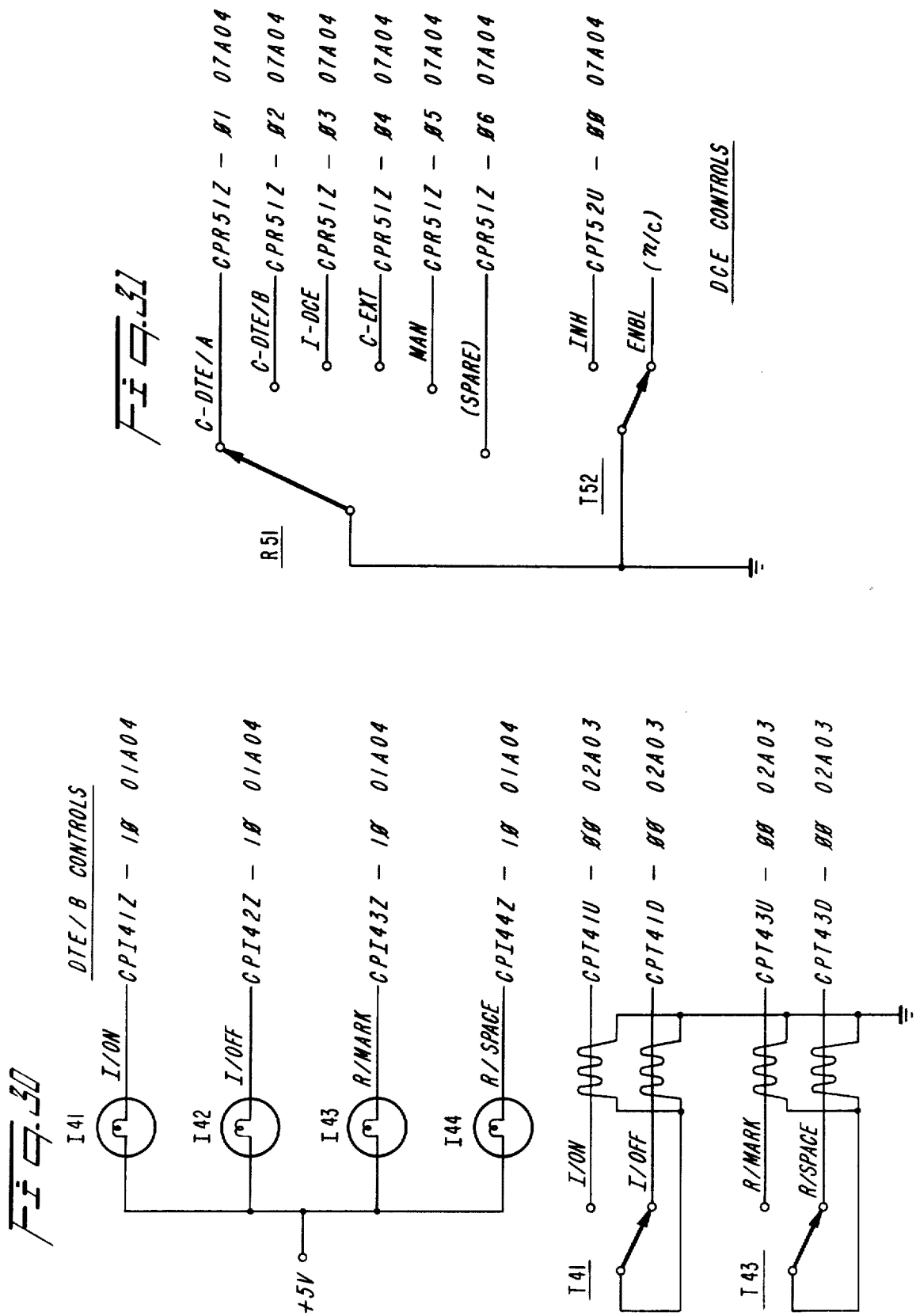

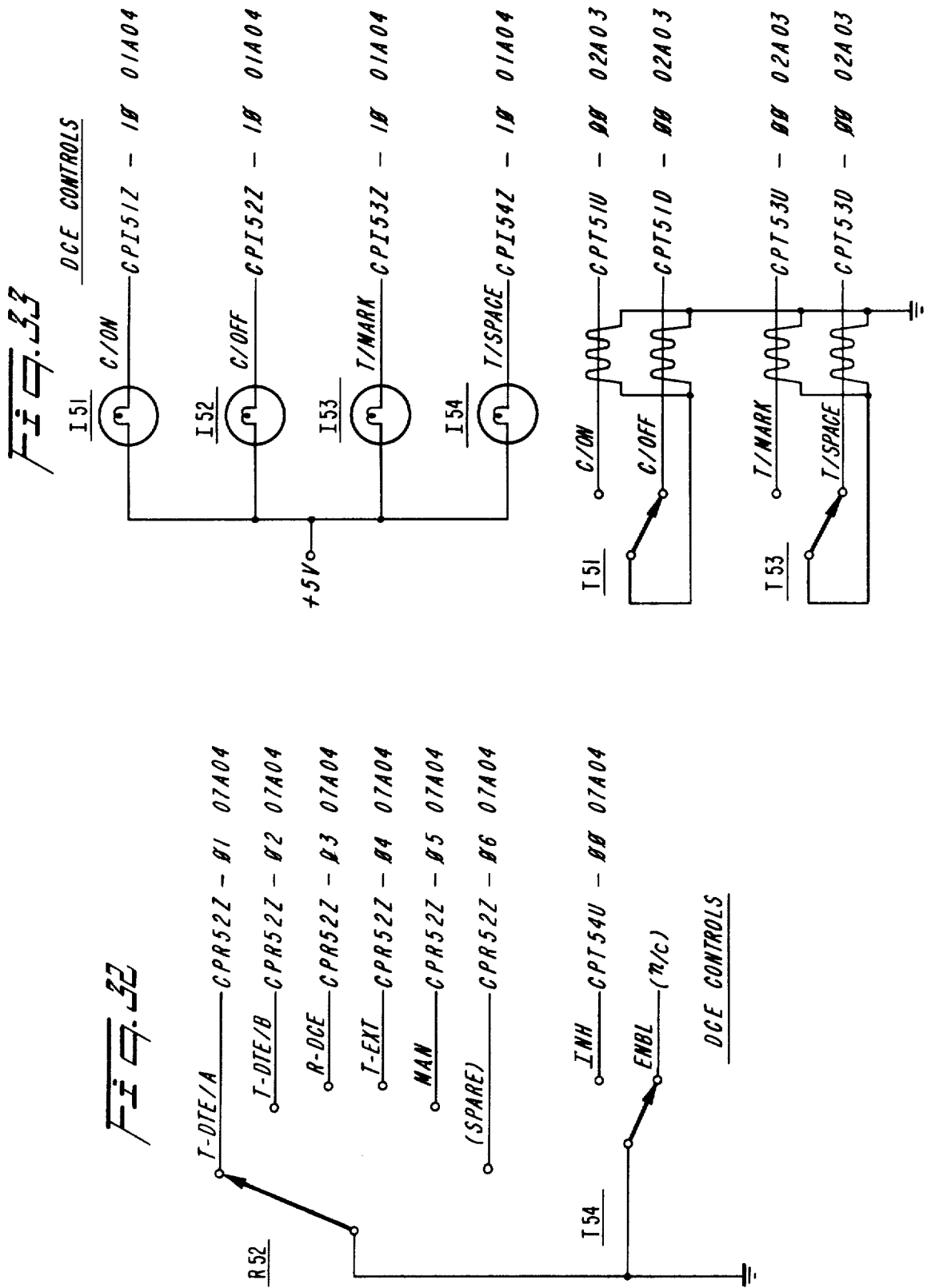

| SIGNAL NAME | ROW/COL /PAGE | SIGNAL NAME | ROW/COL /PAGE | SIGNAL NAME | ROW/COL /PAGE |
|---|---|---|---|---|---|
| BAORSA-00 | 05A07 | CPI01Z-00 | 10D07 | CPR11Z-02 | 09A04 |
| BAORSB-00 | 05B07 | CPI01Z-10 | 01D04 | CPR11Z-03 | 09A04 |
| BAUTOF-00 | 04B07 | CPI02Z-00 | 11D07 | CPR11Z-04 | 09A04 |
| BAUTOF+00 | 04B07 | CPI02Z-10 | 01D04 | CPR31Z-01 | 03A04 |
| BCNTEN-00 | 08B07 | CPI11Z-00 | 09D06 | CPR31Z-02 | 03A04 |
| BCNTEN+00 | 08B07 | CPI11Z-10 | 01D04 | CPR31Z-03 | 03A04 |
| BCNTER+00 | 11C07 | CPI12Z-00 | 08D06 | CPR31Z-04 | 03A04 |
| BCNTZ1+00 | 10B07 | CPI12Z-10 | 01D04 | CPR31Z-05 | 03A04 |
| BCNTZ2+00 | 10B07 | CPI31Z-00 | 03D08 | CPR31Z-06 | 03A04 |
| BCNTZ4+00 | 10B07 | CPI31Z-10 | 01D04 | CPR32Z-01 | 03A04 |
| BCNTZ8+00 | 10B07 | CPI32Z-00 | 04D08 | CPR32Z-02 | 03A04 |
| BDSPOF-00 | 08D07 | CPI32Z-10 | 01D04 | CPR32Z-03 | 03A04 |
| BDSPOF+10 | 09D07 | CPI33Z-00 | 10D08 | CPR32Z-04 | 03A04 |
| BLDSPL-00 | 09C07 | CPI33Z-10 | 01D04 | CPR32Z-05 | 03A04 |
| BMANOF-10 | 03B07 | CPI34Z-00 | 11D08 | CPR32Z-06 | 03A04 |
| BMANOF+00 | 11C03 | CPI34Z-10 | 01D04 | CPR41Z-01 | 05A04 |
| BMANOF+10 | 03B07 | CPI41Z-00 | 03D09 | CPR41Z-02 | 05A04 |
| BOFF01-00 | 01C07 | CPI41Z-10 | 03D04 | CPR41Z-03 | 05A04 |
| BOFF02-00 | 02C07 | CPI42Z-00 | 04D09 | CPR41Z-04 | 05A04 |
| BOFF03-00 | 04C07 | CPI42Z-10 | 03D04 | CPR41Z-05 | 05A04 |
| BOFF04-00 | 03C07 | CPI43Z-00 | 10D09 | CPR41Z-06 | 05A04 |
| BOFFZZ-10 | 04D07 | CPI43Z-10 | 03D04 | CPR42Z-01 | 05A04 |
| BOFFZZ+00 | 03D07 | CPI44Z-00 | 11D09 | CPR42Z-02 | 05A04 |
| CLOCKA-00 | 01B05 | CPI44Z-10 | 03D04 | CPR42Z-03 | 05A04 |
| CLOCKB-00 | 03B05 | CPI51Z-00 | 03D10 | CPR42Z-04 | 05A04 |
| CLOCKC-01 | 01C05 | CPI51Z-10 | 03D04 | CPR42Z-05 | 05A04 |
| CLOCKC-02 | 02C05 | CPI52Z-00 | 04D10 | CPR42Z-06 | 05A04 |
| CLOCKC-03 | 03C05 | CPI52Z-10 | 03D04 | CPR51Z-01 | 07A04 |
| CLOCKC-04 | 04C05 | CPI53Z-00 | 10D10 | CPR51Z-02 | 07A04 |
| CLOCKC-10 | 02D05 | CPI53Z-10 | 03D04 | CPR51Z-03 | 07A04 |
| CLOCKC-30 | 04D05 | CPI54Z-00 | 11D10 | CPR51Z-04 | 07A04 |
| CLOCKC+00 | 01D05 | CPI54Z-10 | 03D04 | CPR51Z-05 | 07A04 |
| CLOCKC+20 | 03D05 | CPP11D-00 | 08A03 | CPR51Z-06 | 07A04 |
| CLOCKU-00 | 01C06 | CPP11U-00 | 08A03 | CPR52Z-01 | 07A04 |
| CLOCKV-00 | 03C06 | CPP12U-00 | 08A03 | CPR52Z-02 | 07A04 |
| CLOCKW-00 | 05C06 | CPR01Z-01 | 11A04 | CPR52Z-03 | 07A04 |
| CLOCKZ-10 | 03D06 | CPR01Z-02 | 11A04 | CPR52Z-04 | 07A04 |
| CLOCKZ-30 | 05D06 | CPR01Z-03 | 11A04 | CPR52Z-05 | 07A04 |
| CLOCKZ+00 | 02D06 | CPR01Z-04 | 11A04 | CPR52Z-06 | 07A04 |
| CLOCKZ+20 | 04D06 | CPR11Z-01 | 09A04 | CPT03D-00 | 08A03 |

Fig. 34a

| SIGNAL NAME | ROW/COL /PAGE | SIGNAL NAME | ROW/COL /PAGE | SIGNAL NAME | ROW/COL /PAGE |
|---|---|---|---|---|---|
| CPT03U-00 | 08A03 | CPT53U-00 | 02A03 | DCEZTA-00 | 11C01 |
| CPT04U-00 | 11A04 | CPT53U-10 | 06C03 | DCEZTB+00 | 11C01 |
| CPT08U-00 | 11A04 | CPT53U-20 | 04D03 | DCEZTZ-10 | 08D10 |
| CPT09U-00 | 11A04 | CPT54U-00 | 07A04 | DCEZTZ+00 | 08C10 |
| CPT13D-00 | 09A04 | DCEZBA+00 | 07A01 | DTEABA+00 | 11A01 |
| CPT14D-00 | 09A04 | DCEZBA+10 | 07C01 | DTEABB-00 | 11A01 |
| CPT15D-00 | 09A04 | DCEZBB-00 | 07A01 | DTEACA+00 | 01A01 |
| CPT16D-00 | 09A04 | DCEZBB-10 | 07C01 | DTEACA+10 | 01C01 |
| CPT17D-00 | 08A03 | DCEZBZ+20 | 08D01 | DTEACB-00 | 01A01 |
| CPT17U-00 | 08A03 | DCEZC1-00 | 01B10 | DTEACB-10 | 01C01 |
| | | | | | |
| CPT18D-00 | 08A03 | DCEZC2-00 | 02B10 | DTEACZ-20 | 02D01 |
| CPT18U-00 | 08A03 | DCEZC3-00 | 03B10 | DTEAI1-00 | 01B08 |
| CPT19U-00 | 09A04 | DCEZC4-00 | 04B10 | DTEAI2-00 | 02B08 |
| CPT20U-00 | 09A04 | DCEZC5-00 | 05B10 | DTEAI3-00 | 03B08 |
| CPT31D-00 | 02A03 | DCEZC6-00 | 06B10 | DTEAI4-00 | 04B08 |
| CPT31U-00 | 02A03 | DCEZCA+00 | 10C01 | DTEAI5-00 | 05B08 |
| CPT31U-10 | 01C03 | DCEZCB-00 | 10C01 | DTEAI6-00 | 06B08 |
| CPT31U-20 | 01D03 | DCEZCZ-10 | 01D10 | DTEAIA+00 | 12A01 |
| CPT32U-00 | 03A04 | DCEZCZ+00 | 01C10 | DTEAIB-00 | 12A01 |
| CPT33D-00 | 02A03 | DCEZIA+00 | 07A01 | DTEAIZ-10 | 01D08 |
| | | | | | |
| CPT33U-00 | 02A03 | DCEZIA+10 | 07C01 | DTEAIZ+00 | 01C08 |
| CPT33U-10 | 02C03 | DCEZIB-00 | 07A01 | DTEAR1-00 | 08B08 |
| CPT33U-20 | 01D03 | DCEZIB-10 | 07C01 | DTEAR2-00 | 09B08 |
| CPT34U-00 | 03A04 | DCEZIZ-20 | 06D01 | DTEAR3-00 | 10B08 |
| CPT41D-00 | 02A03 | DCEZRA-00 | 07A01 | DTEAR4-00 | 11B08 |
| CPT41U-00 | 02A03 | DCEZRA-10 | 07C01 | DTEAR5-00 | 12B08 |
| CPT41U-10 | 03C03 | DCEZRB+00 | 07A01 | DTEAR6-00 | 13B08 |
| CPT41U-20 | 01D03 | DCEZRB+10 | 07C01 | DTEARA-00 | 13A01 |
| CPT42U-00 | 05A04 | DCEZRZ-20 | 05D01 | DTEARB+00 | 13A01 |
| CPT43D-00 | 02A03 | DCEZSA+00 | 07A01 | DTEARZ-10 | 08D08 |
| | | | | | |
| CPT43U-00 | 02A03 | DCEZSA+10 | 07C01 | DTEARZ+00 | 08C08 |
| CPT43U-10 | 04C03 | DCEZSB-00 | 07A01 | DTEASA+00 | 10A01 |
| CPT43U-20 | 01D03 | DCEZSB-10 | 07C01 | DTEASB-00 | 10A01 |
| CPT44U-00 | 05A04 | DCEZSZ-20 | 07D01 | DTEATA-00 | 01A01 |
| CPT51D-00 | 02A03 | DCEZT1-00 | 08B10 | DTEATA-10 | 01C01 |
| CPT51U-00 | 02A03 | DCEZT2-00 | 09B10 | DTEATB+00 | 01A01 |
| CPT51U-10 | 05C03 | DCEZT3-00 | 10B10 | DTEATB+10 | 01C01 |
| CPT51U-20 | 04D03 | DCEZT4-00 | 11B10 | DTEATZ-20 | 01D01 |
| CPT52U-00 | 07A04 | DCEZT5-00 | 12B10 | DTEBBA+00 | 11B01 |
| CPT53D-00 | 02A03 | DCEZT6-00 | 13B10 | DTEBBB-00 | 11B01 |

FIG. 34b

| SIGNAL NAME | ROW/COL /PAGE | SIGNAL NAME | ROW/COL /PAGE | SIGNAL NAME | ROW/COL /PAGE |
|---|---|---|---|---|---|
| DTEBCA+00 | 04A01 | EXTZRZ-20 | 11A08 | SCNTZ2+00 | 07B05 |
| DTEBCA+10 | 01C01 | EXTZRZ+10 | 07B02 | SCNTZ2+10 | 08D05 |
| DTEBCB-00 | 04A01 | EXTZSZ-10 | 07C02 | SCNTZ4+00 | 07B05 |
| DTEBCB-10 | 01C01 | EXTZSZ+00 | 06A02 | SCNTZ4+10 | 09D05 |
| DTEBCZ-20 | 04D01 | EXTZTZ-00 | 06A02 | SCNTZ7-00 | 10C05 |
| DTEBI1-00 | 01B09 | EXTZTZ-20 | 11A10 | SCNTZ7+10 | 11C05 |
| DTEBI2-00 | 02B09 | EXTZTZ+10 | 06B02 | SCNTZ8-10 | 09A05 |
| DTEBI3-00 | 03B09 | HSTPCK-00 | 05B06 | SCNTZ8+00 | 07B05 |
| DTEBI4-00 | 04B09 | HSTPCK+00 | 05B06 | SCNTZ8+10 | 10D05 |
| DTEBI5-00 | 05B09 | HSTPCR-00 | 06A06 | SCYCLE-00 | 09C03 |
| DTEBI6-00 | 06B09 | JACK01+00 | 07D06 | SFULLZ-10 | 06Y06 |
| DTEBIA+00 | 12B01 | JACK01+10 | 12B02 | SFULLZ+00 | 10C03 |
| DTEBIB-00 | 12B01 | JACK02+00 | 05D07 | SPAR01+00 | 03B05 |
| DTEBIZ-10 | 01D09 | JACK02+10 | 12B02 | SPAR02+00 | 03B05 |
| DTEBIZ+00 | 01C09 | JACK03+00 | 02D08 | SPAR03+00 | 03B05 |
| DTEBR1-00 | 08B09 | JACK03+10 | 12B02 | SPAR04+00 | 03B05 |
| DTEBR2-00 | 09B09 | JACK04+00 | 09D08 | SPAR05+00 | 03B05 |
| DTEBR3-00 | 10B09 | JACK04+10 | 12B02 | SPRCR1+00 | 04D03 |
| DTEBR4-00 | 11B09 | JACK05+00 | 02D10 | SPRCR2+00 | 01D03 |
| DTEBR5-00 | 12B09 | JACK05+10 | 12B02 | SRUNYY+00 | 08C03 |
| DTEBR6-00 | 13B09 | JACK06+00 | 09D10 | SRUNZZ-00 | 01B06 |
| DTEBRA-00 | 13B01 | JACK06+10 | 12B02 | SRUNZZ+00 | 01B06 |
| DTEBRB+00 | 13B01 | MONZCD+00 | 04B02 | STEPEB-00 | 03A06 |
| DTEBRZ-10 | 08D09 | MONZCS+00 | 03C02 | STEPEB+00 | 03A06 |
| DTEBRZ+00 | 08C09 | MONZOF-00 | 05D02 | STEPEC+00 | 03X06 |
| DTEBSA+00 | 10B01 | MONZON+00 | 04D02 | STEPED-00 | 03Y06 |
| DTEBSB-00 | 10B01 | MONZRC+00 | 02B02 | STEPED+00 | 03Y06 |
| DTEBTA-00 | 04A01 | MONZRD-00 | 02C02 | | |
| DTEBTA-10 | 01C01 | MONZRS+00 | 03B02 | | |
| DTEBTB+00 | 04A01 | MONZTC+00 | 01B02 | | |
| DTEBTB+10 | 01C01 | MONZTD-00 | 01C02 | | |
| DTEBTZ-20 | 03D01 | OSC5MH-10 | 02A05 | | |
| EXTZBZ-10 | 06C02 | OSC5MH+00 | 01A05 | | |
| EXTZBZ+00 | 06A02 | OSC5MH+20 | 03A05 | | |
| EXTZBZ+20 | 02B07 | PULUPA+00 | 08B03 | | |
| EXTZCZ-10 | 08B02 | PULUPB+00 | 08B03 | | |
| EXTZCZ+00 | 06A02 | RESETZ-00 | 12B03 | | |
| EXTZIZ-10 | 09B02 | SCNTCR+00 | 07B05 | | |
| EXTZIZ+00 | 06A02 | SCNTZ1+00 | 07B05 | | |
| EXTZRZ-00 | 06A02 | SCNTZ1+10 | 07D05 | | |

Fig. 34c

SIMULATOR FOR BIT AND BYTE SYNCHRONIZED DATA NETWORK

FIELD OF THE INVENTION

This invention pertains to data communication systems and, more particularly, to a simulator for testing devices adapted for operation with a bit and byte synchronized data communication network.

BACKGROUND OF THE INVENTION

A bit and byte synchronized data communication network has been proposed in accordance with standards specified by the International Telegraph and Telephone Consultative Committee (CCITT) and is described in the "CCITT Sixth Plenary Assembly - Orange Book, Vol. VIII.2, Public Data Networks", published in 1977 by the International Telecommunication Union, Geneva. Various requirements, in particular those designated X.21, X.24, and X.27, promulgated in this CCITT specification call for generation within the data network of bit and byte timing signals which are used for establishing a byte control protocol (BCP) or a bit oriented protocol (BOP) for organizing and handling data messages.

In designing and servicing equipment adapted to interface with this data communication network, it is necessary to have a means for testing the equipment under transmit and receive conditions duplicating those which occur during actual operation of the system. At the same time, it is necessary to be able to test various forms of communication devices in a variety of operational modes. Furthermore, the testing apparatus should be simple to operate, compact, and reliable to facilitate operation at different locations at which testing may be required.

OBJECTS AND SUMMARY OF THE INVENTION

It is therefore an object of the present invention to provide an improved simulator for use within testing a data communication system operating in accordance with bit and byte synchronized protocols.

It is further object to provide a simple, reliable, and compact unit which may be employed with a variety of devices and which is adapted to provide many different testing configurations suitable for simulating many different types of operational conditions.

To achieve the foregoing objects and in accordance with the invention, a data communication simulator system is provided in which the basic operational conditions of a bit and byte synchronized data network may be simulated by generation of a bit timing signal, a byte timing signal, data signals, and control and status indication signals. Such signals may be generated for example in accordance with the voltage level and timing requirements set forth in the aforementioned CCITT data network specification and, in particular, with the requirements of sections X.21, X.24, and X.27 thereof. Accordingly, the simulator apparatus of the invention is adapted to generate a bit timing signal S, a byte timing signal B, transmit data and control signals T and C, and receive data and status indication signals R and I. Means are provided for enabling interconnection of a variety of data terminal devices and testing units so that virtually any transmit and receive conditions may be readily and simply duplicated for testing purposes. Manual as well as automatic testing modes are provided, the manual mode including a signal stepping control arranged to enable either full or half cycle operation.

The accompanying drawings which are incorporated in and constitute a part of the specification, illustrate a preferred embodiment of the invention and, together with the description, serve to explain the principles of the invention.

BRIEF DESCRIPTION OF THE DRAWINGS

In the drawings

FIGS. 1–11 represent eleven sheets of LBDs (logic block diagrams) providing detailed circuit schematics of the control logic utilized in a preferred embodiment of the simulator apparatus of the invention. Each of FIGS. 1–10 is divided into an "a" section and a "b" section which, when arranged side-by-side with the "a" section on the left, represent an integrated LDB sheet.

FIG. 12 is a functional block diagram of an exemplary test setup utilizing the simulator of the invention.

FIG. 13 is a wiring list depicting the interconnection of logic signal leads with the pins of the cable connector employed at the DTE/B simulator port.

FIG. 14 is a wiring list depicting the interconnection of logic signal leads with the pins of the cable connector used at the DTE/A simulator port.

FIG. 15 is a wiring list depicting the interconnection of logic signal leads with the pins of the cable connector employed at the DCE simulator port.

FIG. 16 is a wiring list depicting the interconnection of logic signal leads with the pins of the cable connector employed at the MONITOR simulator port.

FIG. 17 is a wiring list depicting the interconnection of logic signal leads with the pins of the cable connector employed at the external source (EXT) simulator port.

FIG. 18 is a wiring list showing the interconnection of logic signal leads with each of six test jacks provided with the simulator system.

FIGS. 19–20 illustrate the different control panel switches and indicators utilized in the B section of the simulator control panel and further illustrates the logic signal leads connected to each such switch and indicator.

FIGS. 21–24 depict the indicators and control switches employed in the S section of the control panel and further illustrate the logic signal leads connected to each such switch and indicator.

FIGS. 25–27 illustrate the switches and indicators employed in the DTE/A section of the control panel and further illustrate the logic signal leads connected to each such switch and indicator.

FIGS. 28–30 illustrate the switches and indicators employed in the DTE/B section of the control panel as well as the logic signal leads connected thereto.

FIGS. 31–33 illustrate the switches and indicators employed in the DCE section of the control panel and also identify the logic signal leads coupled thereto.

FIGS. 34a, 34b, and 34c constitute a signal source reference table indicating the source of each signal identified in the logic block diagrams of FIGS. 1–11 and in the wiring lists control panel diagrams of FIGS. 13–33.

DETAILED DESCRIPTION OF EMBODIMENT

Figure 1A:
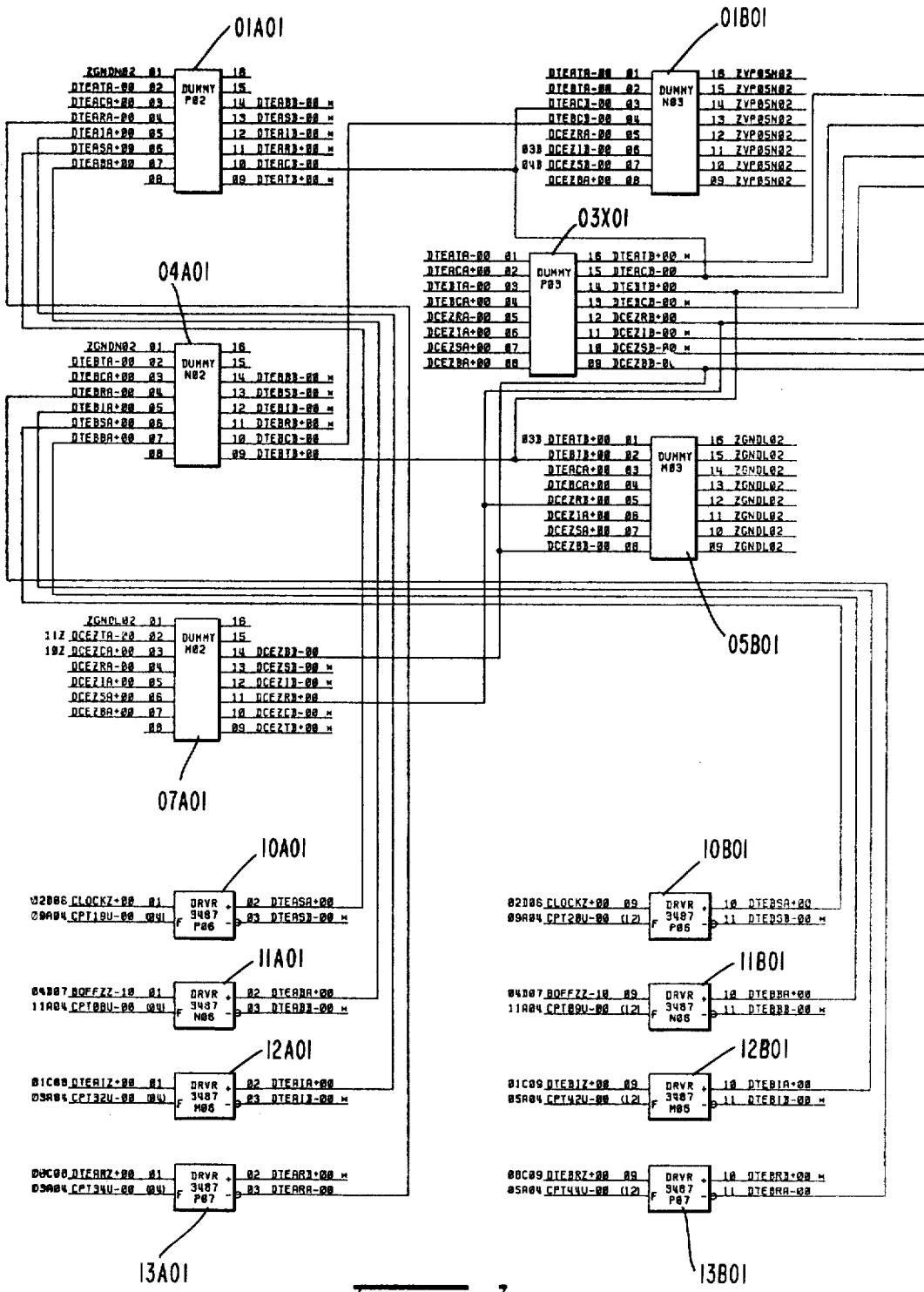
Figure 1B:
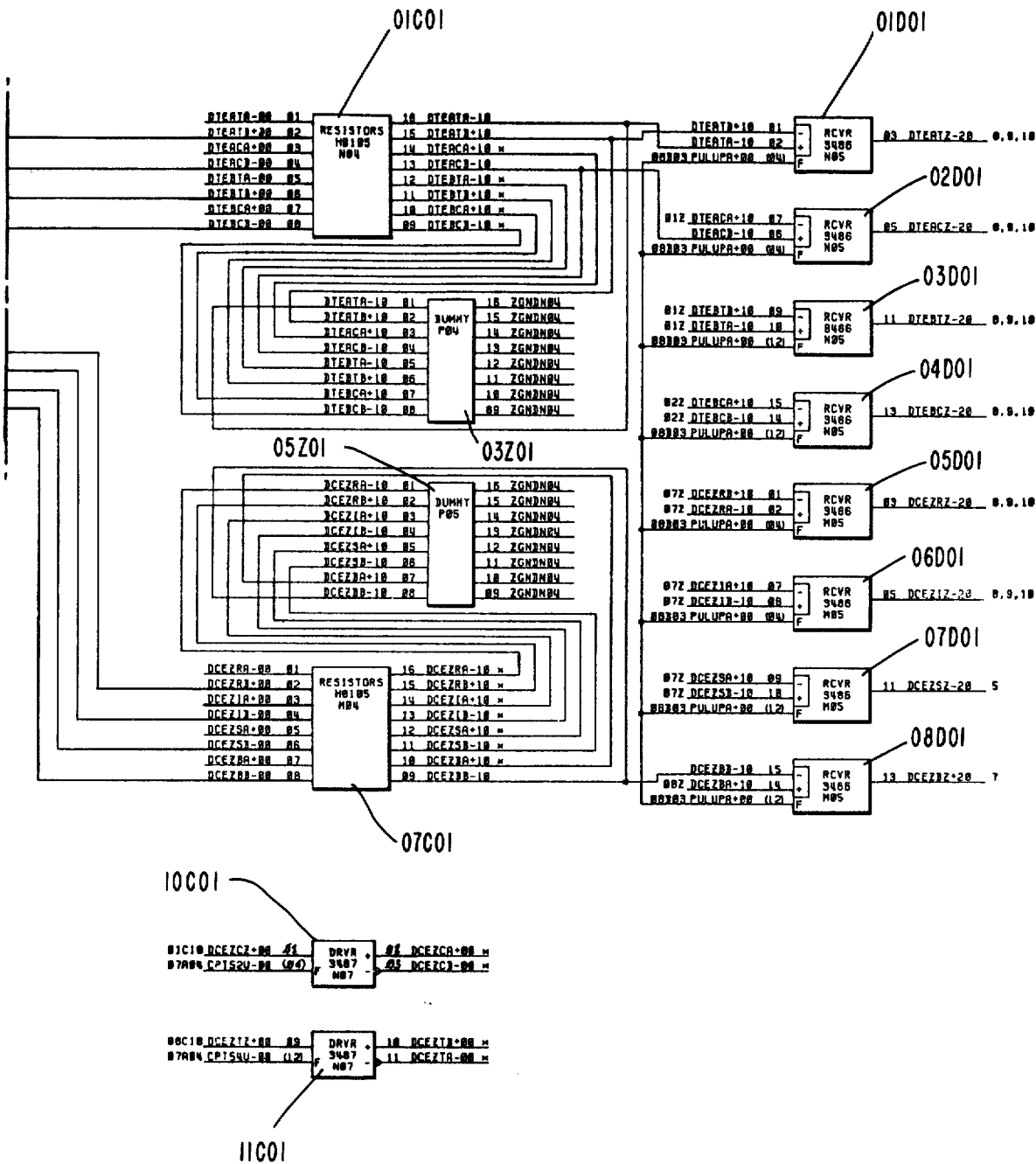
Figure 2A:
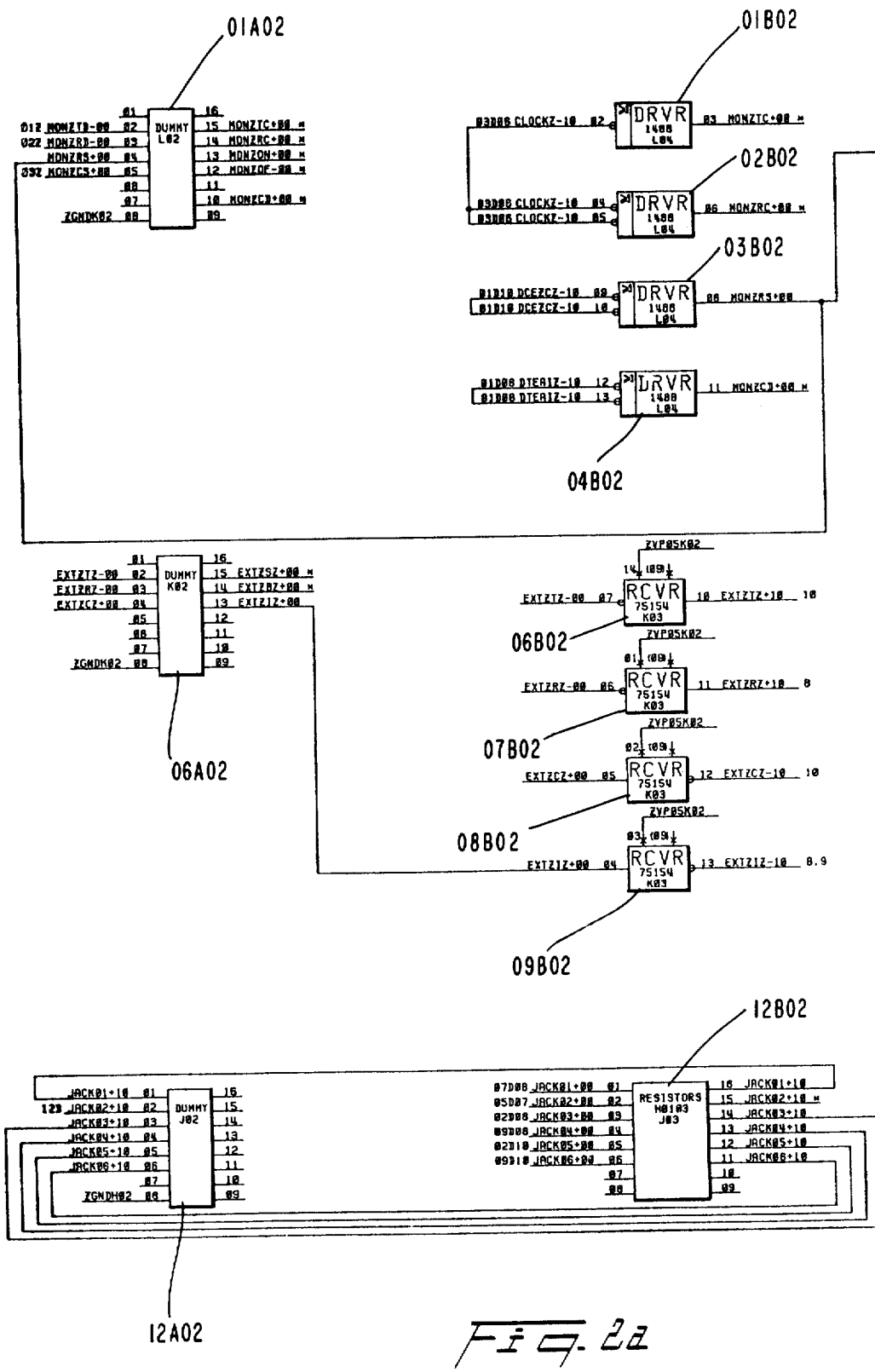
Figure 2B:
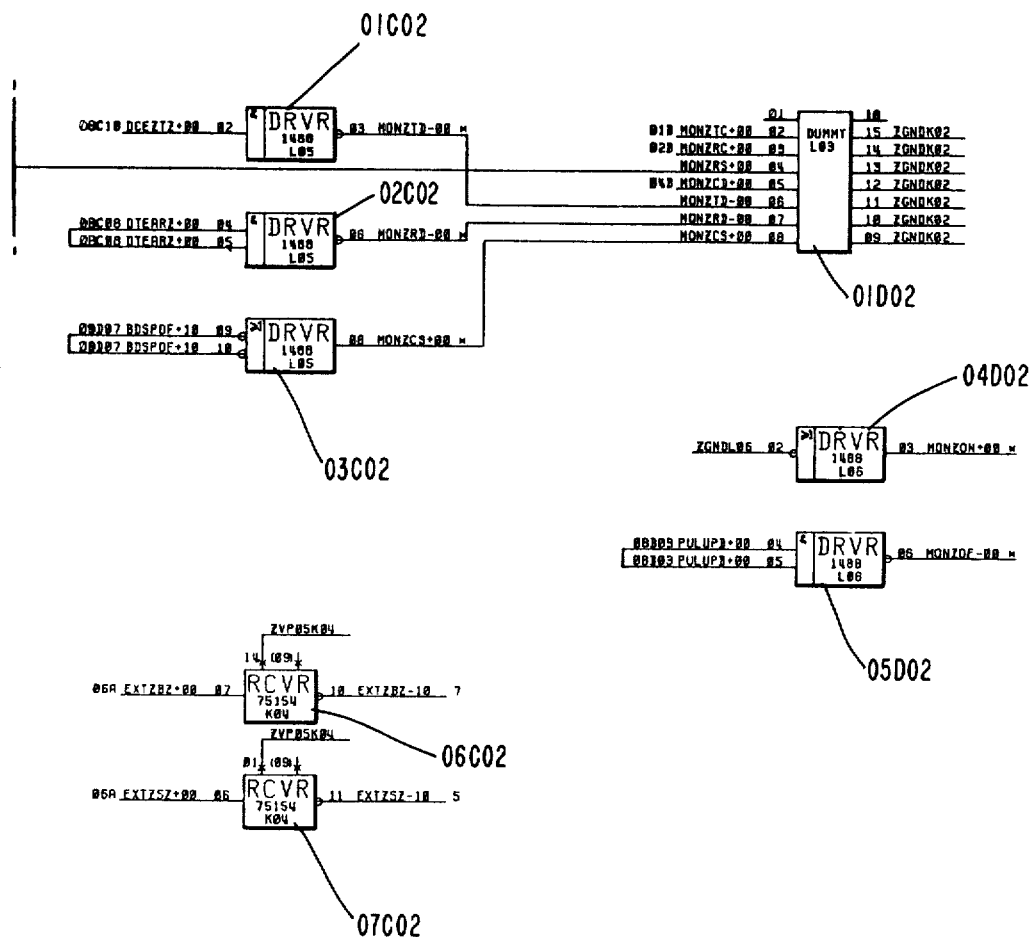
Figure 4B:
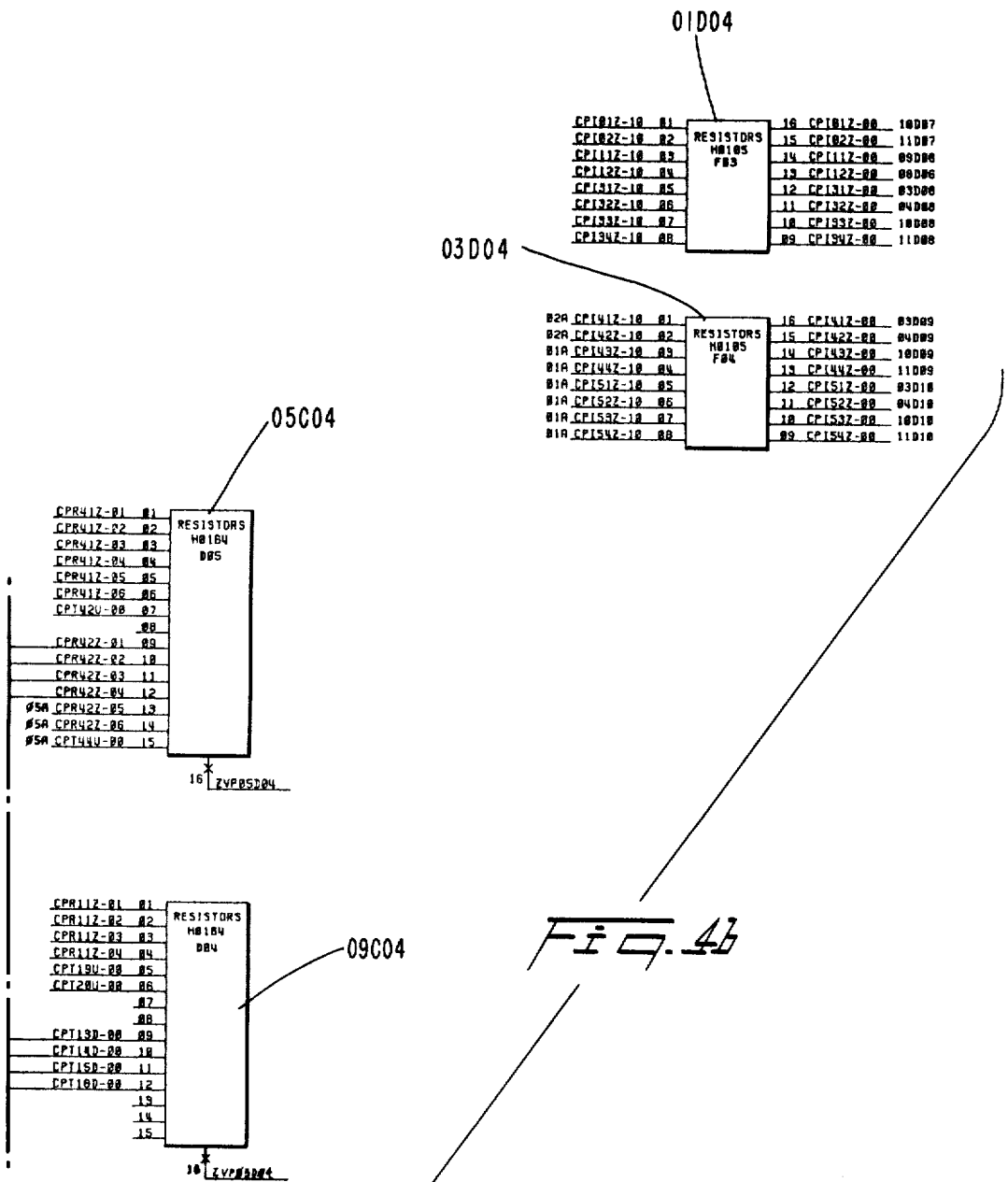
Figure 5A:
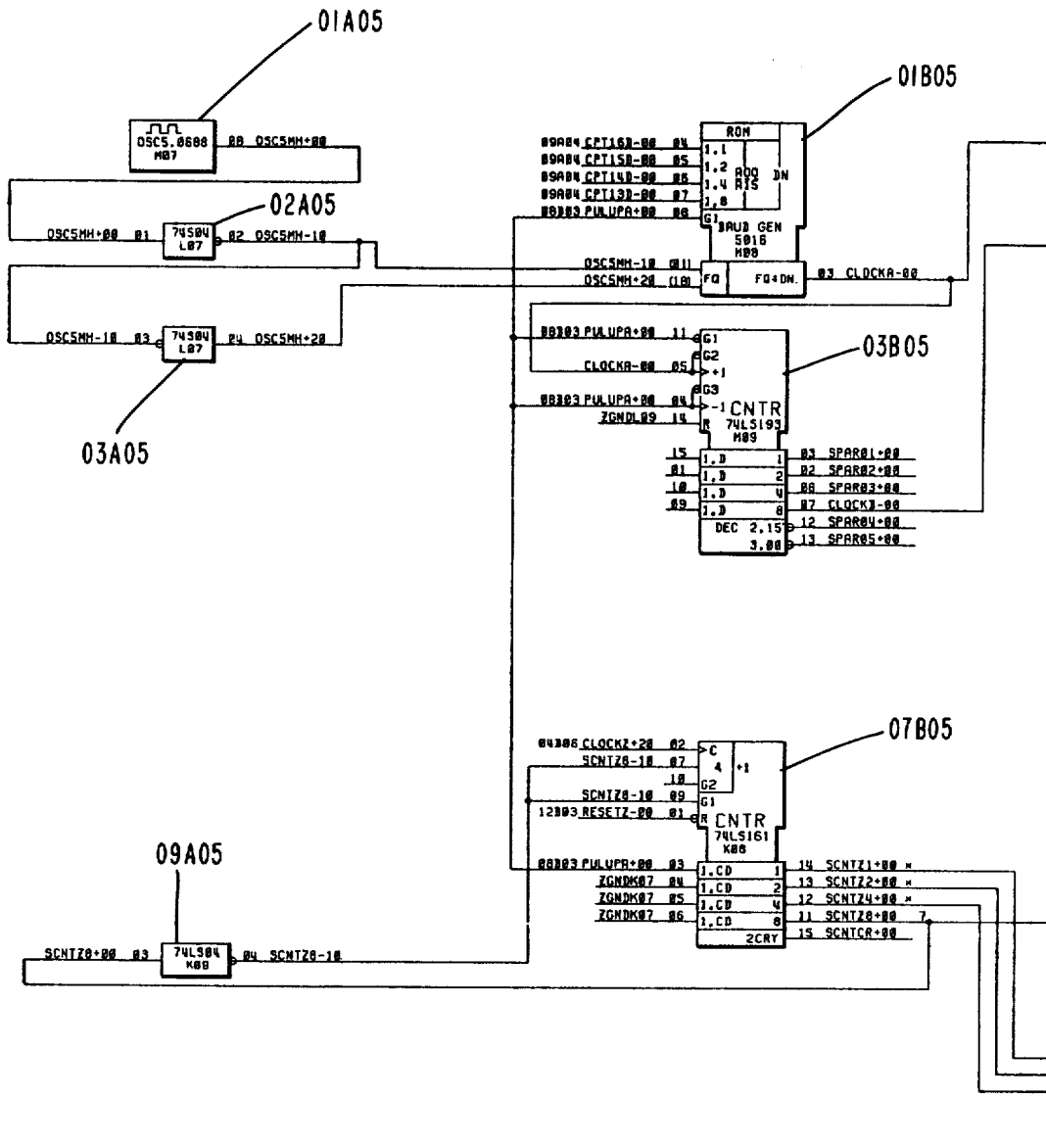
Figure 6A:
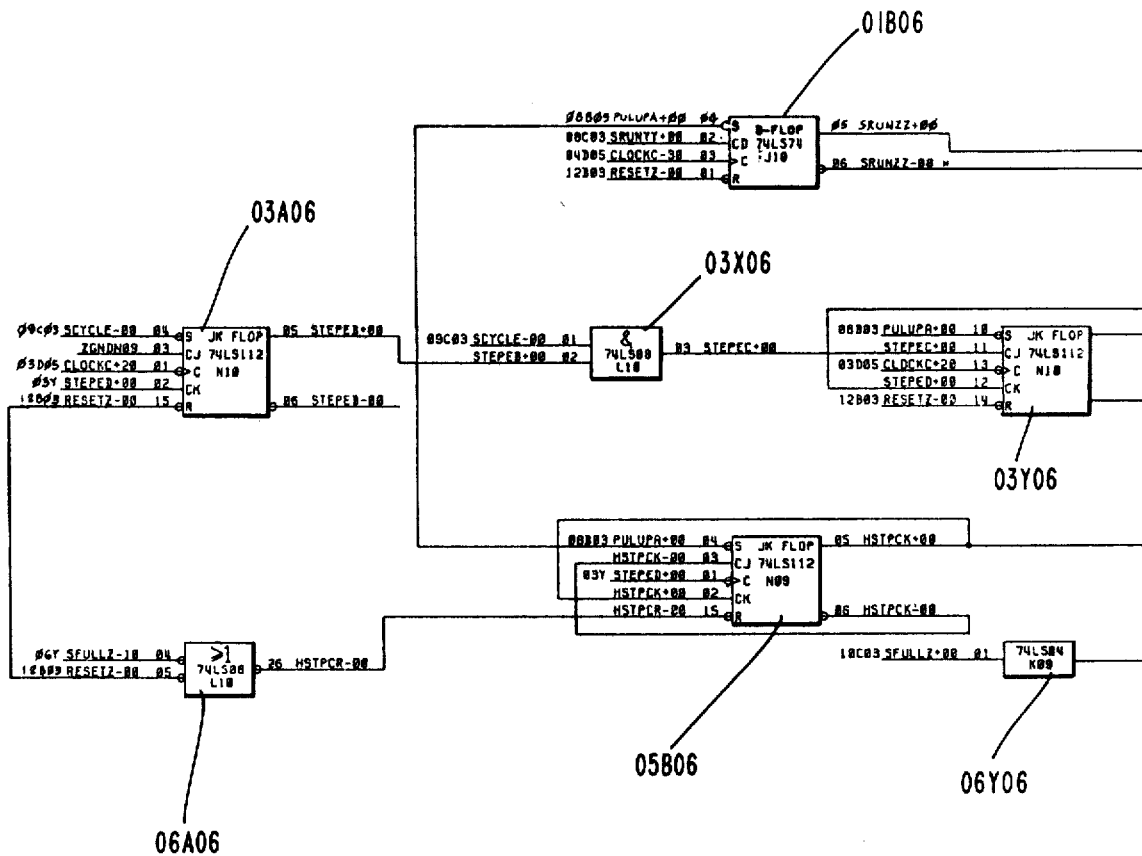
Figure 6B:
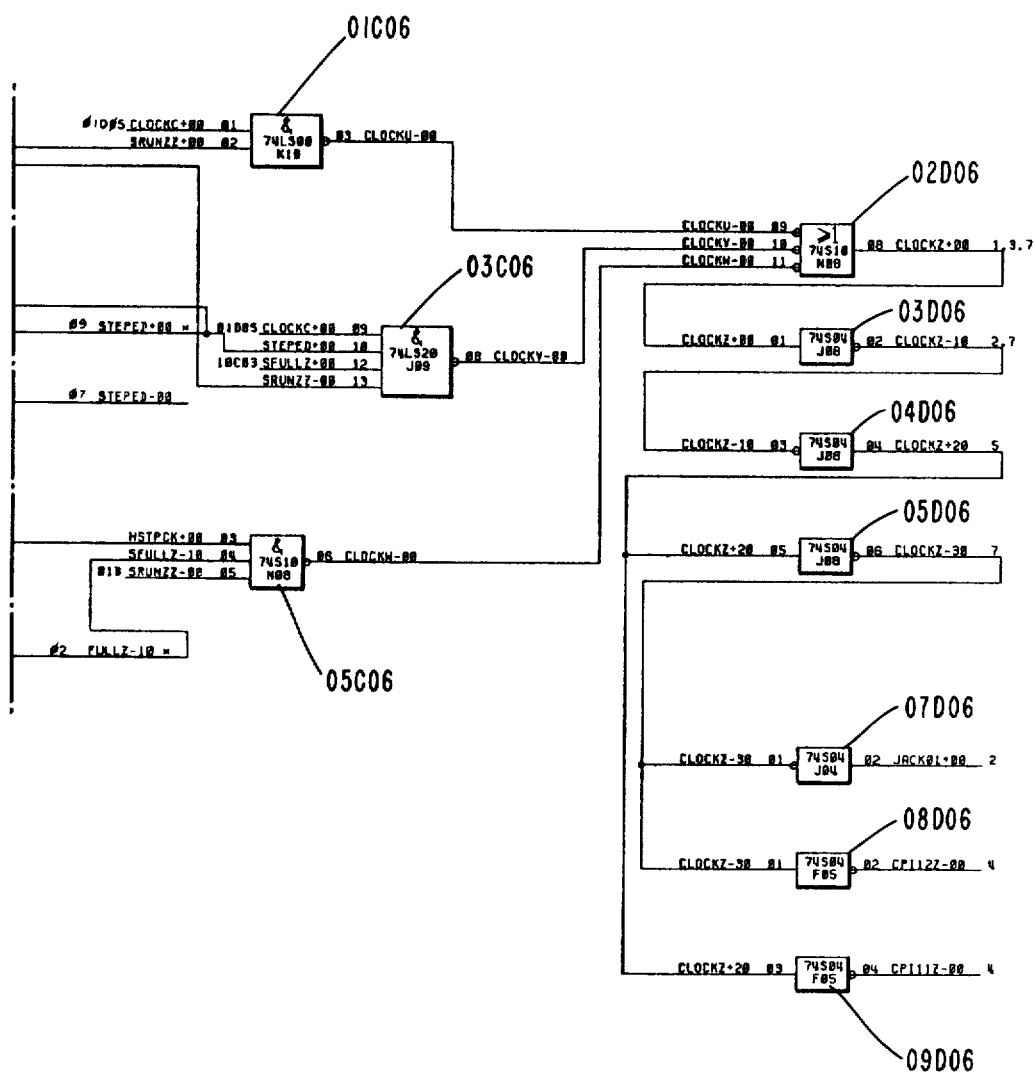
Figure 7D:
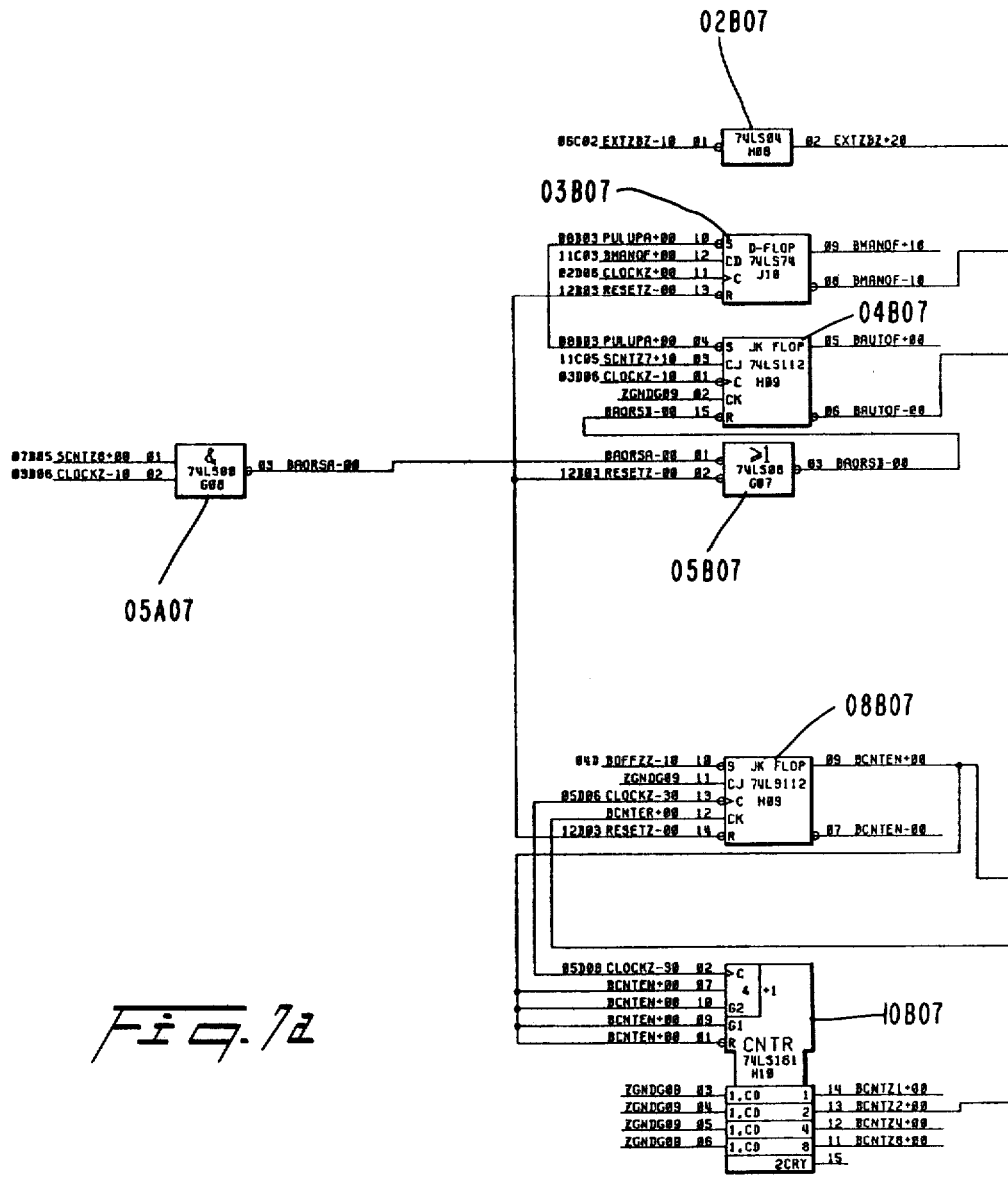
Figure 7B:
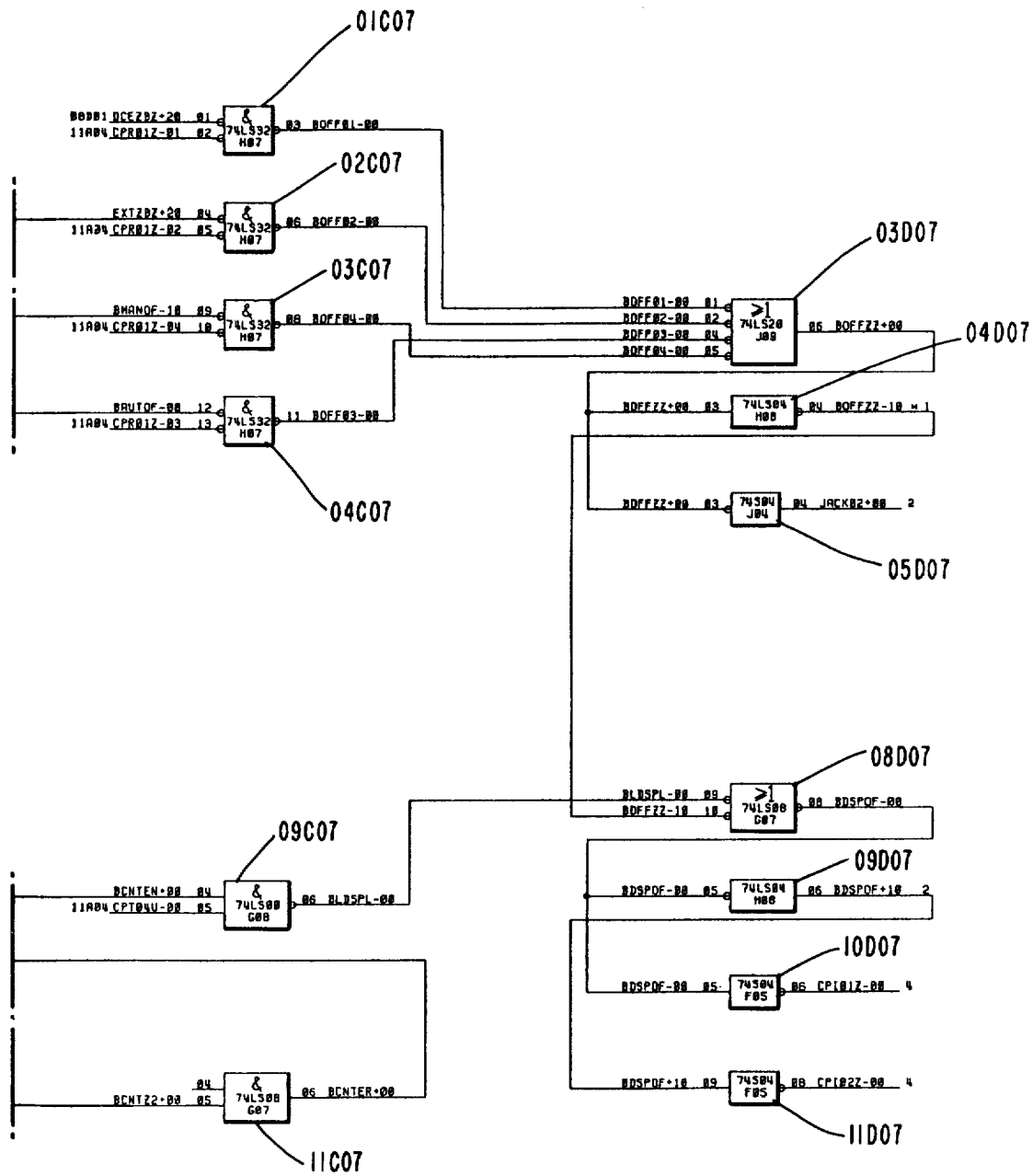
Figure 10A:
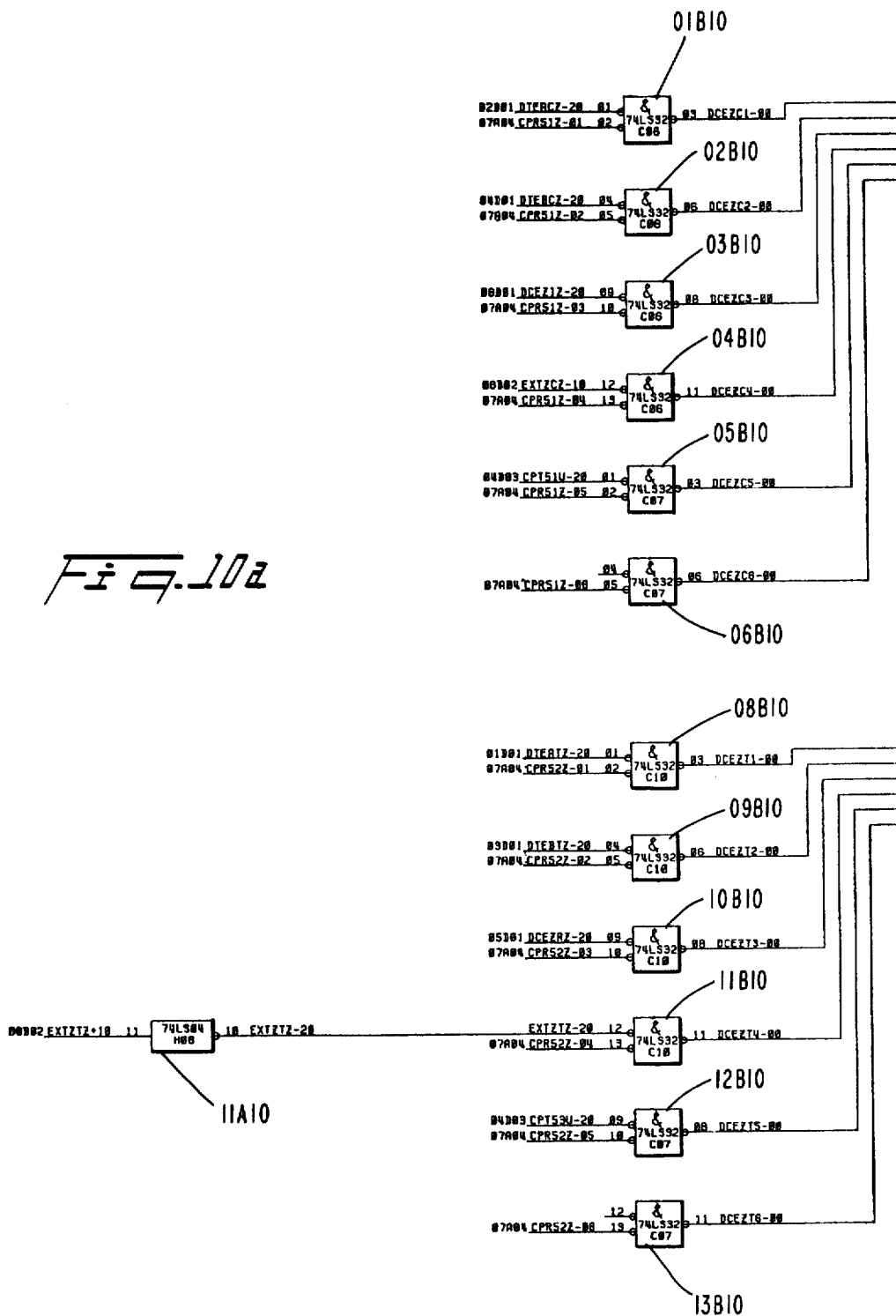
Figure 10B:
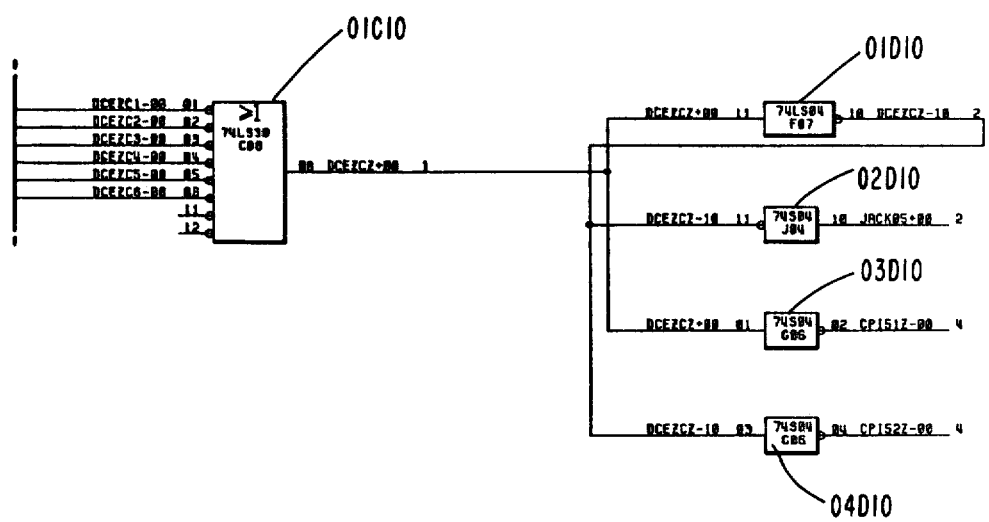
Figure 11:
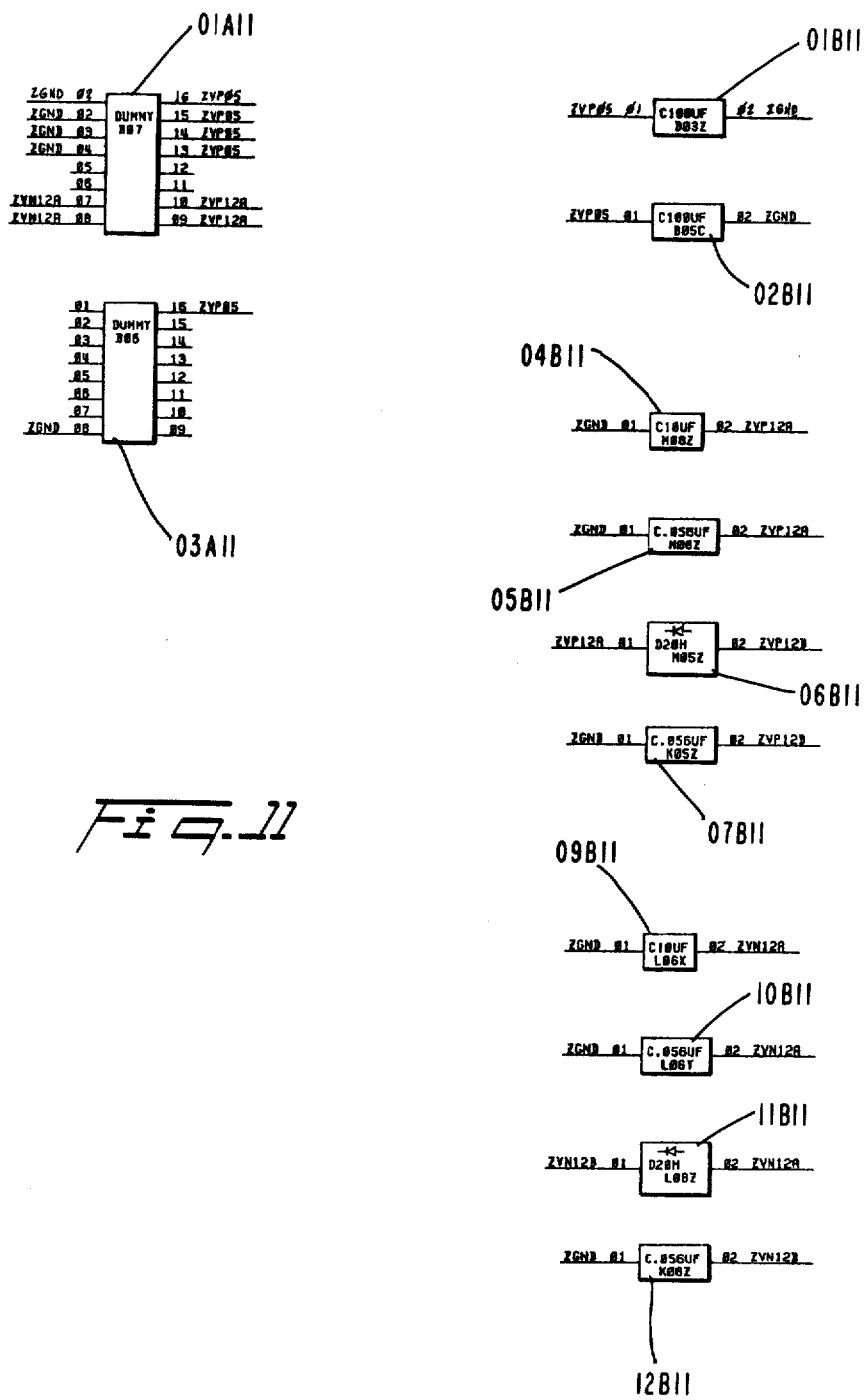

FIG. 12 shows, in block diagram form, an exemplary data communication test setup employing the simulator apparatus 10 of the invention, a data terminal device (DTE) 12 which is to be tested, and an analyzer 14 which is designed to display selected signals and to perform, under program control, a variety of data transfer test routines. DTE 12 may be, for example, a communication line adapter of the type described in copending patent application Ser. No. 053,110 entitled "Communication Line Adapter For A Bit And Byte Synchronized Data Network", filed June 28, 1979 in the name of James C. Raymond and assigned to the assignee of the present invention. The communication line adapter described in the referenced copending application is of the type which is compatible with a bit and byte synchronized data network and which operates in accordance with the aforementioned CCITT specifications.

The analyzer 14 may be any suitable commercially available analyzer such as the "Datascope" manufactured by Spectron or the "Datalink Analyzer" manufactured by Halcyon.

The simulator 10 employs two input/output ports 20 and 22 designated the DTE/A and DTE/B simulator ports. Additionally, the simulator 10 employs a MONITOR output port 24 and an external source (EXT) input port 26. Ports 24 and 26 are adapted to enable the coupling of analyzer 14 to the simulator. A DCE input/output port 28 is also provided to permit connection of an additional data communication device of the type operable in accordance with the CCITT standard.

The simulator incorporates a control panel 10' having five sections S, B, DTE/A, DTE/B, and DCE each having a variety of control switches and indicators, described hereinafter, operable to set up different testing configurations and to generate different patterns of testing signals.

The circuit components and connector elements employed in the simulator 10 are illustrated in detail in the detailed logic schematic diagrams of FIGS. 1-11 and in the connector wiring lists and control panel diagrams of FIGS. 13-33. To facilitate an understanding of the invention, each of the logic diagrams of FIGS. 1-10 should be separated from the remainder of the patent and joined in side-by-side orientation with the "a" section on the left. For example, FIGS. 1a and 1b should be arranged with FIG. 1a on the left and 1b on the right such that the dot-dash margin lines are adjacent to one another.

The detailed logic schematics are not described herein in exhaustive element-by-element detail in an effort to avoid unnecessarily lengthening and complicating the specification. Each of the elements shown in the FIG. 1-11 schematics is identified by a unique 5 digit reference code such as "01A01" in which the last 2 digits indicate the figure in which the element appears. Thus, all elements ending in "01" appear in FIG. 1, those ending in "02" appear in FIG. 2, etc. The interconnections between the hardware elements shown in FIGS. 1-11, when not specifically illustrated by means of connecting lines, is disclosed by use of signal identifiers such as "DTEATA-00" (see the inputs to element 01A01). The source of this signal can be readily determined by reference to the signal source tables provided in FIGS. 34a-34c. Thus, as noted in FIG. 34b, the signal DTEATA-00 emanates from element 01A01, as noted above.

The logic schematics of FIGS. 1-11 illustrate known, standard integrated circuit logic chips which are available from commercial IC suppliers. The individual part identification code is provided on each element shown. For example, driver circuit 10A01 is Motorola Part No. 3487, which is specially manufactured to comport with the CCITT X.27 standard. Similarly, the receiver circuits such as element 01D01 are Motorola Part No. 3486, also manufactured to comport to the CCITT standard.

The connectors employed at the simulator ports 20, 22, 24, 26 and 28 are configured in accordance with the wiring lists provided in FIGS. 13-17. Each of these wiring lists indicates the number of connector pins employed at each port and indicates the particular logic signal lead, from the logic schematics of FIGS. 1-11, coupled to each connector pin. In addition, the wiring lists disclose, by way of the 5 digit reference code noted above, the particular logic element to which each indicated logic lead is coupled. For example, referring to FIG. 13, connector pin 2 at the DTE/B port is coupled to logic lead DTEBTA-00 which connects to logic element 04A01, as do the leads connected to pins 3-7 and 9-14 of the same connector. Thus, the wiring lists of FIGS. 13-18 provide ready identification of the various lines connected to each of the cable connectors at the five simulator ports and jack panels. The lists further indicate how each of the connectors is tied to the logic circuits.

The same convention is employed to designate the interconnection of the control switches and indicators of FIGS. 19-33 to the logic circuits. For example, referring to FIG. 19, the switch R01 is a rotary switch having four contacts as indicated. The upper contact is connected to signal lead CPR01Z-01 which, as noted at the right of the drawing, is coupled to a logic element 11A04, as are the remaining three contacts of that rotary switch. These connections are also identifiable by referring to signal CPR01Z-01 in the signal source reference table of FIG. 34a. The convention used in FIGS. 19-33 calls for rotary switches to be identified with an "R" number, e.g., R01. Toggle switches are denoted by "T" numbers while push-button switches, are indicated by "P" numbers. "I" reference numbers are used for indicator lamps. Element H11 shown in FIG. 24 represents a digital display indicator which is driven by the signals indicated to display any of the decimal digits 1 through 8.

Therefore, the exact structural configuration of the simulator 10 is readily discernable through inspection of FIGS. 1-11 and 13-33, following the conventions described above. Further detailed description of the simulator structure is omitted to avoid unduly burdening the specification.

OPERATION

With reference to FIGS. 1-33, operation of the simulator apparatus of the invention is hereinafter described. The test configuration generally depicted in FIG. 12 enables an operator to exercise the line adapter 12 by transmitting, in either a step-by-step or continuous manner, timing, data, and control signals comporting with the standards of the aforementioned CCITT specifications from simulator port 20 to DTE 12. Data and control signals transmitted back to port 20 by the line adapter are displayed at the control panel and may be further displayed and evaluated by analyzer 14. The step-by-step operation permitted by the simulator permits the operator to test the various control sequences executed by the line adapter in a highly advantageous manner. As is described hereinafter, the operator may choose a "full cycle" or a "half cycle" mode of operation whereby the line adapter responds to either single S signal transitions or dual S signal transitions.

To set up the test configuration illustrated in FIG. 12, the operator first sets the control panel switches as follows. In the DTE/A section, rotary switches R31 (FIG. 25) and R32 (FIG. 26) are set to the "manual" position (contact 5) while toggle switches T31 and T33 (FIG. 27) are set to the I and R signal values desired (ON/OFF, mark/space). Toggle switches T32 and T34 (FIGS. 25 and 26) are switched to the ENBL position.

The switches in the DTE/B section of the control panel are irrelevant to the configuration shown in FIG. 12 since the port 22 is not used. Likewise, port 26 is not employed since signals from analyzer 14 are not used in the particular test set up shown. While DCE port 28 is not connected to an external device, the switches in the DCE section of the control panel are used to control the application of response signals C and T to the DCE indicator lights and to MONITOR port 24 for transmission to the analyzes. Rotary switches R51 (FIG. 31) and R52 (FIG. 32) are thus set to their first (top) contact to channel the C and T response signals received at port 20 from DTE 12 to the analyzer 14 and to the DCE indicators.

Next, the operator sets up the switches in the S section of the control panel by setting the four toggle swiches T13–T16 (FIG. 23) to select a desired S timing signal frequency. Also, mode switch T17 (FIG. 21) is set to the "step" position and cycle switch T18 is set to either "half" or "full", depending on whether it is desired to step the system with individual signal transitions or with dual (low-to-high followed by high-to-low) signal transitions. Switches T19 and T20 (FIG. 22) are set to enable while R11 (FIG. 21) is used to select either the high or low frequency value.

Figure 27:
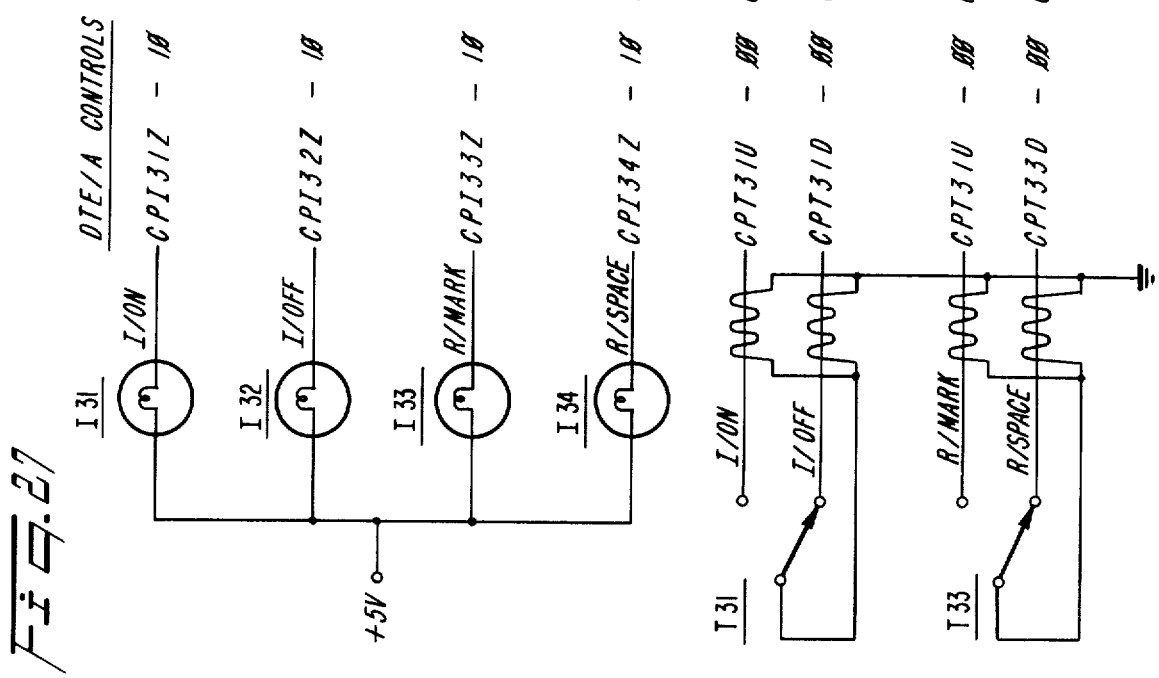
Figure 26:
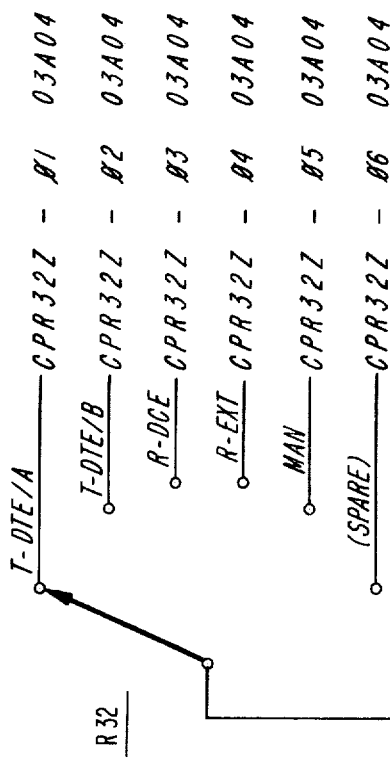
Figure 29:
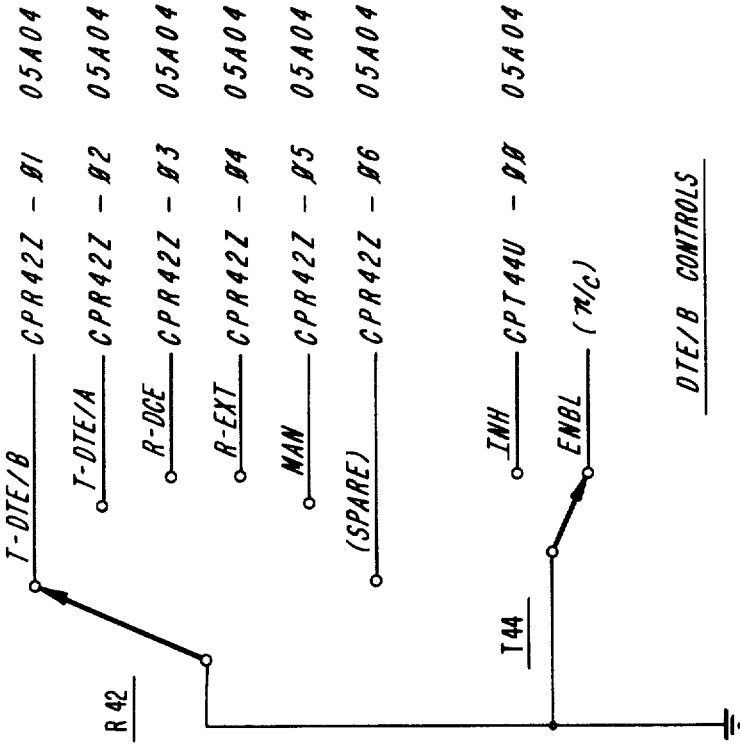
Figure 28:
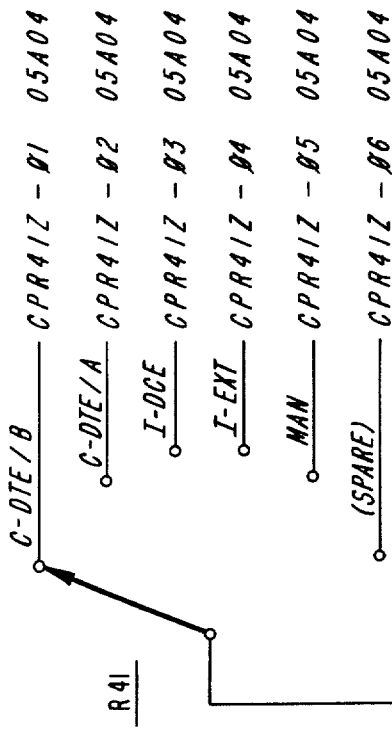

Thereafter, the operator actuates push-button switch P11 (FIG. 22) in a desired sequence. Each time switch P11 is actuated, a single or a double S signal transition is transmitted to the line adapter 12 accompanied by an R signal and an I signal, which are transmitted at the levels which have been selected via switches T31 and T32 (FIG. 27). The operation of the simulator logic circuits in generating these signals is as follows.

Oscillator 01A05 produces a continuous train of clock pulses which are supplied to the baud rate generator 01B05 and the output clock signals therefrom are coupled to gate 01C05 and to the step-down counter 03B05. The output from the latter is fed to gate circuit 02C05. The setting of S source select switch R11 enables one of the two gates 01C05 or 02C05 to pass the clock signal. The frequency of the clock signals generated by the circuits 01B05 and 03B05 is determined in accordance with the setting of the frequency selection switches T13–T16, which control the inputs to baud generator 01B05 to set the frequency thereof. The clock signal is gated through OR 01D05 and thereafter is fed to the logic circuits shown in FIG. 6.

Operation of the push-button switch P11 supplies SCYCLE-00 to flop 03A06 and AND 03X06. When the push-button is released after initial depression, AND 03X06 conditions flop 03Y06 to be set on the next negative-going clock signal transition. The flop resets on the next negative clock transition so that the output STEPED+00 from flop 03Y06 first goes high and then low to provide a dual transition pulse through AND 03Z06 and OR 02D06 to the S signal lead at DTE/A port 20. This is the full cycle step mode of operation.

If the half cycle mode of operation had been selected, AND 03Z06 would not be conditioned and instead JK flip-flop 05B06 along with gate 05C06 control the generation of the S signal. This results in the production of a single positive or negative signal transition for transmission through OR 02D06 to the line adapter. The cross-coupling of the S and R outputs of flop 05B06 to the K and J inputs thereof causes the flop to cycle only once for each STEPED+00 input, thus producing only a positive-going or a negative-going S signal transition for each push-button actuation.

At the same time, the positive-going S transition loads registers 01D03 and 04D03 with the values of the R and I signals which were selected by toggle switches T31 and T33. The outputs of these registers are transmitted over the R and I signal leads to line adapter 12 along with the S signal. Any change in the R or I level relative to the level transmitted during the previous cycle, will result in an R or I transition in sync with the positive S transition.

The line adapter generates response signals C and T on the following negative-going transition of the S signal and these signals are channelled through simulator port 20 as signals DTEACA+00, DTEACB−00 and DTEATA−00, DTEATB+00. Those signals are fed through connector element 01A01 to receivers 01D01 and 02D01, where they are converted to the signals DTEATZ-20 and DTEACZ-20. These signals are gated through ANDS 01B10 and 08B01 and are thereafter transmitted through ORs 01C10 and 08C10 to the driver circuits 03D10, 04D10 and 10D10, 11D10 for transmission to the DCE control panel indicator lights for display. The same signals are also channel to the MONITOR driver circuits 03B02 and 01C02, whereupon they are presented to connector 01A02 and from there are channelled to the MONITOR port connector for presentation to the analyzer 14.

Thus, the operator, by sequentially operating the S signal push-button P11 (FIG. 22), can transmit any desired sequences of data signals R and status signals I to the line adapter 12 and can observe the response signals T and C generated thereby on a step-by-step basis. It is noted that counter 07B05 generates a B byte timing signal in sync with every eighth S signal transmitted to the line adapter. The B signal is also coupled to the line adapter in accordance with the requirements of the CCITT bit and byte synchronized data network. Counter 07B05 also drives the 8 digit control panel display H11 (FIG. 24) via the signals SCNTZ1+00 through SCNTZ8+00 to provide a display of the current bit position within the byte interval.

The simulator may also be set up through the control panel switches and port connectors to provide different test configurations. In one such configuration, the S timing signal can be supplied on a continuous (running) basis by setting of toggle switch T17 (FIG. 21) to the "run" position. This disables AND gates 03Z06 and 05C06 and conditions AND gate 01C06 to pass a continuous sequence of clock pulses supplied by flip-flop 01B06 to the S lead out of simulator port 20. In this mode of operation, the rotary switches R31 and R32 can be set to position 4 (I-EXT) to permit analyzer 14 to supply, under program control, various R and I signal states synchronized to the S and B timing signals. At the same time, the C and T response signals from the line adapter 12 are channelled through monitor port 24 to the analyzer to allow the latter to conduct a full sequence of automatic test routines at operational bit transmission frequencies.

Still further, the system can be arranged to provide a pair of DTE units coupled respectively to the DTE/A and DTE/B ports 20 and 22 of the simulator. With this set up, the two DTEs can communicate with each other through the simulator while analyzer 14 monitors the transactions. To provide this configuration, rotary switches R31 and R32 (FIGS. 25 and 26) are set to position 2 (C-DTE/B and T-DTE/B, respectively) while the rotary selector switches R41 and R42 (FIGS. 28 and 29) controlling the DTE/B port are likewise set to position 2 to couple the C and T responses received at port 20 out of port 22.

In this mode, the DCE switches remain in position 1 to enable the response signals to be additionally transmitted to analzyer 14. The B switch R01 (FIG. 19) is set to the "auto" position and toggle switches T08 and T09 (FIG. 20) are set to the enable position. The S switches are set as follows. R11 (FIG. 21) is set in either the high or low position while toggle switch T17 is set to "run". Toggle switch T18 and push-button P11 (FIG. 22) are not relevant since their positions do not affect operation of the system in this mode. Switches T19 and T20 remain in the enable position. Frequency switches T13–T16 (FIG. 23) are set to establish the desired frequency.

Thus, as seen from the above, the simulator of the invention provides a highly versatile system for testing a bit and byte synchronized data communication device, or devices, under a variety of conditions, including continuously running data streams at operational frequencies and step-by-step manually controlled sequences to enable pin point analysis of specific faults. The system is constructed in a single integrated unit and is readily portable for field testing operations.

It will be apparent to those skilled in the art that various modifications and variations could be made to the embodiment of the invention as hereinabove described without departing from the spirit and scope of the invention.

What is claimed is:

1. Apparatus for simulating data communication signal conditions comprising:
    an oscillator for generating a clock signal;
    means for gating said clock signal to a communication terminal device, said gating means including a control switch and first timing means actuated by said control switch and responsive to a single cycle of said clock signal to transmit to said terminal device a positive-going signal transition followed by a negative-going signal transition;
    means for transmitting to said communication terminal device additional control signals synchronized with the positive-going transition of said gated clock signal; and
    means for receiving and displaying response signals transmitted from said terminal device in response to the negative-going transition of said gated clock signal.

2. The apparatus of claim 1 further comprising:
    second timing means selectively operable to inhibit the operation of said first timing means and responsive to actuation of said control switch and to a single cycle of said clock signal to transmit to said terminal device either a positive-going signal transition or a negative-going signal transition;
    whereby selection of said second timing means enables transmission of said gated clock signal and said control signals to said terminal device during one actuation of said control switch and receipt and display of said response signals from said terminal device during another actuation of said control switch.

* * * * *